(12) United States Patent
McDaniel et al.

(10) Patent No.: US 10,246,528 B2
(45) Date of Patent: Apr. 2, 2019

(54) CHROMIUM (III) CATALYST SYSTEMS WITH ACTIVATOR-SUPPORTS

(71) Applicant: Chevron Phillips Chemical Company LP, The Woodlands, TX (US)

(72) Inventors: Max P. McDaniel, Bartlesville, OK (US); Mark L. Hlavinka, Klingwood, TX (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 514 days.

(21) Appl. No.: 14/151,032

(22) Filed: Jan. 9, 2014

(65) Prior Publication Data

US 2015/0191554 A1    Jul. 9, 2015

(51) Int. Cl.
| | |
|---|---|
| C08F 4/69 | (2006.01) |
| C08F 4/78 | (2006.01) |
| B01J 31/34 | (2006.01) |
| C08F 10/02 | (2006.01) |
| C08F 4/639 | (2006.01) |
| C08F 4/6392 | (2006.01) |

(52) U.S. Cl.
CPC .......... C08F 10/02 (2013.01); C08F 4/63904 (2013.01); C08F 4/63912 (2013.01); C08F 4/63916 (2013.01); C08F 4/63927 (2013.01)

(58) Field of Classification Search
CPC ................ B01J 31/24; C08F 4/69; C08F 4/78
See application file for complete search history.

(56) References Cited

U.S. PATENT DOCUMENTS

| | | | |
|---|---|---|---|
| 2,951,816 A * | 9/1960 | Banks | B01J 23/26 502/256 |
| 3,242,099 A | 3/1966 | Manyik | |
| 3,248,179 A | 4/1966 | Norwood | |
| 3,953,413 A * | 4/1976 | Hwang | C08F 10/00 526/96 |
| 4,146,695 A | 3/1979 | van de Leemput | |
| 4,364,855 A | 12/1982 | McDaniel et al. | |
| 4,501,885 A | 2/1985 | Sherk et al. | |
| 4,588,790 A | 5/1986 | Jenking, III et al. | |
| 4,788,171 A * | 11/1988 | Klendworth | B01J 23/26 502/155 |
| 4,794,096 A | 12/1988 | Ewen | |
| 4,803,253 A | 2/1989 | McDaniel et al. | |
| 4,808,561 A | 2/1989 | Welborn | |
| 5,001,204 A | 3/1991 | Klendworth et al. | |
| 5,352,749 A | 10/1994 | DeChellis et al. | |
| 5,401,820 A | 3/1995 | McDaniel et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 5,576,259 A | 11/1996 | Hasegawa | |
| 5,648,439 A | 7/1997 | Bergmeister et al. | |
| 5,723,399 A | 3/1998 | Takemoto et al. | |
| 5,739,220 A | 4/1998 | Shamshoum et al. | |
| 5,807,938 A | 9/1998 | Kaneko | |
| 5,919,983 A | 7/1999 | Rosen | |
| 6,011,127 A * | 1/2000 | Monoi | C08F 10/00 526/127 |
| 6,096,679 A | 8/2000 | Lonfils et al. | |
| 6,107,230 A | 8/2000 | McDaniel et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,329,476 B1 * | 12/2001 | Martin | C08F 210/16 502/127 |
| 6,355,594 B1 | 3/2002 | McDaniel et al. | |
| 6,376,415 B1 | 4/2002 | McDaniel et al. | |
| 6,388,017 B1 * | 5/2002 | McDaniel | C08L 23/0815 525/240 |
| 6,391,816 B1 | 5/2002 | McDaniel et al. | |
| 6,395,666 B1 | 5/2002 | McDaniel et al. | |
| 6,524,987 B1 | 2/2003 | Collins et al. | |
| 6,525,148 B1 | 2/2003 | McDaniel et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |

(Continued)

FOREIGN PATENT DOCUMENTS

| | | | |
|---|---|---|---|
| EP | 0055866 | 7/1982 | |
| WO | WO 9302111 A1 * | 2/1993 | .......... B01J 37/0238 |

(Continued)

OTHER PUBLICATIONS

Coutinho et al. Polymerization of ethylene by chromium acetylacetonate/methylaluminoxane catalyst system. Polymer Bulletin 40. 1998. pp. 695-700.*

McDaniel, Max P. *Advances in Catalysis*, vol. 53, Burlington: Academic Press, 2010, pp. 123-127.

Janzen, et al., "Diagnosing Long-Chain Branching in Polyethylenes," Journal of Molecular Structure, (1999), pp. 485-486, 569-584.

Arnett, Raymond, L., "Zero-Shear Viscosity of Some Ethyl Branched Paraffinic Model Polymers," J. Phys. Chem. (1980), vol. 84, pp. 649-652.

(Continued)

*Primary Examiner* — Rip A Lee

(74) *Attorney, Agent, or Firm* — Merchant & Gould, P.C.

(57) ABSTRACT

Methods for preparing supported chromium catalysts containing a chromium (III) compound and an activator-support are disclosed. These supported chromium catalysts can be used in catalyst compositions for the polymerization of olefins to produce polymers having low levels of long chain branching, and with greater sensitivity to the presence of hydrogen during polymerization.

24 Claims, 15 Drawing Sheets

(56) References Cited

U.S. PATENT DOCUMENTS

| | | |
|---|---|---|
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,831,141 B2 | 12/2004 | McDaniel et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,163,906 B2 * | 1/2007 | McDaniel ............... C08F 10/00 502/117 |
| 7,199,073 B2 | 4/2007 | Martin |
| 7,214,642 B2 * | 5/2007 | McDaniel ............... C08F 10/00 423/625 |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,517,939 B2 | 4/2009 | Yang et al. |
| 7,601,665 B2 | 10/2009 | McDaniel et al. |
| 7,619,047 B2 | 11/2009 | Yang et al. |
| 7,763,561 B2 | 7/2010 | McDaniel et al. |
| 7,863,210 B2 | 1/2011 | Murray et al. |
| 7,884,163 B2 | 2/2011 | McDaniel et al. |
| 7,919,639 B2 | 4/2011 | Murray et al. |
| 8,012,900 B2 | 9/2011 | Murray et al. |
| 8,080,681 B2 | 12/2011 | Murray et al. |
| 8,114,946 B2 | 2/2012 | Yang et al. |
| 8,309,485 B2 | 11/2012 | Yang et al. |
| 2004/0059070 A1 | 3/2004 | Whitte et al. |
| 2007/0293638 A1 * | 12/2007 | Hagerty ............... C08F 210/16 526/64 |
| 2013/0137839 A1 * | 5/2013 | Yu ............... C08F 110/02 526/113 |
| 2013/0158216 A1 * | 6/2013 | Ding ............... C08F 10/00 526/114 |
| 2014/0275457 A1 | 9/2014 | McDaniel et al. |

FOREIGN PATENT DOCUMENTS

| | | |
|---|---|---|
| WO | WO 1999/60033 | 11/1999 |
| WO | 20050107943 | 11/2005 |
| WO | 20060052232 | 5/2006 |

OTHER PUBLICATIONS

Y. Yu, et al., "Long Chain Branches in Metallocene-Catalyzed Polyethylene Determined by a Combination of SEC/Multi-Angle Lights Scattering, NMR and Rheology," *Polymer Preprints*, (2003), 44, pp. 49-50.

*Modern Plastics Encyclopedia*, Mid-Nov. 1995 Issue, vol. 72, No. 12, 3 pages.

*Film Extrusion Manual—Process, Materials, Properties*, TAPPI Press, 1992, 16 pages.

C. A. Hieber, et al., "Some Correlations Involving the Shear Viscosity of Polystyrene Melts," Rheol. Acta, 28, (1989), pp. 321-332.

C.A. Hieber, et al., Shear-Rate-Dependence Modeling of Polymer Melt Viscosity, *Polymer Engineering and Science*, (1992), vol. 32, No. 14, pp. 931-938.

R. B. Bird, et al, "*Dynamics of Polymeric Liquids*," vol. 1, Fluid Mechanics, 2nd Edition, John Wiley & Sons (1987), pp. 170-172.

Wyatt, Philip J., "Light Scattering and the Absolute Characterization of Macromolecules," published in *Analytica Chimica Acta*, 272 (1993), Elsevier Science Publishers B.V., Amsterdam, pp. 1-40.

International Patent Application PCT/US2015/010094 Search Report dated Jul. 21, 2015.

* cited by examiner

CHROMIUM (III) CATALYST SYSTEMS WITH ACTIVATOR-SUPPORTS

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Traditional chromium-based catalyst systems can produce olefin polymers having, for example, good extrusion processibility and polymer melt strength, typically due to their broad molecular weight distribution (MWD). In some end-use applications, it can be beneficial for the olefin polymer also to have low levels of long chain branching. Moreover, it can be beneficial for the catalyst system employed to have a high catalytic activity for olefin polymerization, particularly in the presence of relatively high levels of co-catalyst, as well as a greater sensitivity to hydrogen to enable a broader range of polymer melt index and molecular weight. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, the present invention relates to supported chromium-based catalyst systems, and to chromium compounds supported on activator-supports. Catalyst compositions of the present invention which contain these supported chromium catalysts can be used to produce, for example, ethylene-based homopolymers and copolymers. A particular catalyst composition disclosed herein can comprise a supported chromium catalyst comprising a chromium (III) compound, and an activator-support comprising a solid oxide treated with an electron-withdrawing anion; and a co-catalyst. In some aspects, the co-catalyst can comprise an organoaluminum compound.

Processes for producing the supported chromium catalyst also are described herein. For example, the process can comprise (i) combining a chromium (III) compound with an activator-support comprising a solid oxide treated with an electron-withdrawing anion to form a mixture; and (ii) subjecting the mixture to a non-oxidizing atmosphere at a peak temperature to produce the supported chromium catalyst.

The present invention also contemplates and encompasses olefin polymerization processes. Such processes can comprise contacting a catalyst composition with an olefin monomer and optionally an olefin comonomer in a polymerization reactor system under polymerization conditions to produce an olefin polymer. Generally, the catalyst composition employed can comprise any of the chromium (III) compounds (or derivatives thereof), any of the activator-supports, and any of the co-catalysts disclosed herein. For example, activator-supports which can be utilized in the catalyst compositions and/or polymerization processes can include a fluorided solid oxide and/or a sulfated solid oxide.

Polymers produced from the polymerization of olefins, resulting in homopolymers, copolymers, etc., can be used to produce various articles of manufacture. A representative and non-limiting example of an olefin polymer (e.g., an ethylene copolymer) consistent with aspects of this invention can be characterized as having the following properties: a Mw in a range from about 400,000 to about 900,000 g/mol (or from about 300,000 to about 1,000,000 g/mol); a ratio of Mw/Mn of greater than or equal to about 70 (or greater than or equal to about 35, or greater than or equal to about 50, or greater than or equal to about 90); and a relaxation time of less than or equal to about 100 sec (or less than or equal to about 70 sec, or less than or equal to about 120 sec). Another representative and non-limiting ethylene-based polymer described herein can have a Mw in a range from about 400,000 to about 900,000 g/mol (or from about 300,000 to about 1,000,000 g/mol); a ratio of Mw/Mn of greater than or equal to about 70 (or greater than or equal to about 35, or greater than or equal to about 50, or greater than or equal to about 90); and less than or equal to about 0.001 LCB per 1000 total carbon atoms (or less than or equal to about 0.005 LCB per 1000 total carbon atoms, or less than or equal to about 0.002 LCB per 1000 total carbon atoms). Yet another representative and non-limiting ethylene-based polymer described herein can have a HLMI of less than or equal to about 1 g/10 min (or less than or equal to about 5 g/10 min, or less than or equal to about 10 g/10 min); a ratio of Mw/Mn of greater than or equal to about 70 (or greater than or equal to about 35, or greater than or equal to about 50, or greater than or equal to about 90); and less than or equal to about 0.001 LCB per 1000 total carbon atoms (or less than or equal to about 0.005 LCB per 1000 total carbon atoms, or less than or equal to about 0.002 LCB per 1000 total carbon atoms).

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
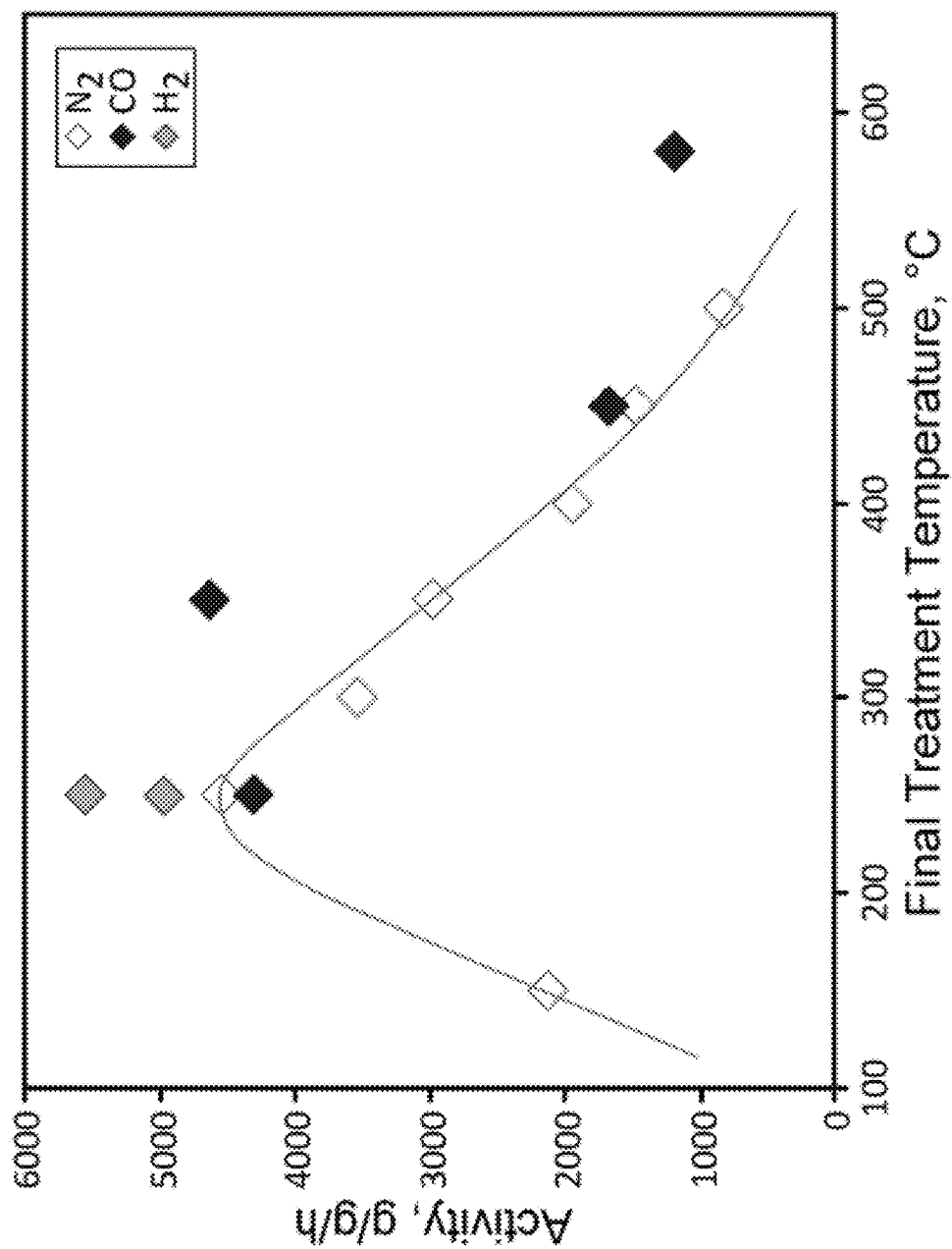
FIG. 1 presents a plot of catalyst activity versus the final (peak) treatment temperature for chromium (III) catalyst systems containing fluorided silica-coated alumina and prepared in inert or reducing atmospheres.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) a supported chromium catalyst, and (ii) a co-catalyst.

The terms "a," "an," "the," etc., are intended to include plural alternatives, e.g., at least one, unless otherwise specified. For instance, the disclosure of "an activator-support" or "a chromium (III) compound" is meant to encompass one, or mixtures or combinations of more than one, activator-support or chromium (III) compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups can have from 1 to 36 carbon atoms, or from 1 to 18 carbon atoms (e.g., $C_1$ to $C_{18}$ hydrocarbyl groups, $C_1$ to $C_8$ hydrocarbyl groups, etc.), and can include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s)

disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron compounds, organoaluminum compounds, and the like, that can constitute one component of a catalyst composition, when used, for example, in addition to a support (e.g., an activator-support) and a chromium compound. The term "co-catalyst" is used regardless of the actual function of the compound or any chemical mechanism by which the compound may operate.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, activator-support, or chromium (III) compound, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, by a disclosure that the peak molecular weight (Mp) can be in a range from about 30,000 to about 130,000 g/mol, Applicants intend to recite that the Mp can be any molecular weight in the range and, for example, can be equal to about 30,000, about 40,000, about 50,000, about 60,000, about 70,000, about 80,000, about 90,000, about 100,000, about 110,000, about 120,000, or about 130,000 g/mol. Additionally, the Mp can be within any range from about 30,000 to about 130,000 (for example, from about 40,000 to about 80,000), and this also includes any combination of ranges between about 30,000 and about 130,000 (for example, the Mp can be in a range from about 30,000 to about 75,000, or from about 90,000 to about 125,000). Likewise, all other ranges disclosed herein should be interpreted similarly.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to supported chromium catalysts, methods for preparing the supported catalysts and catalyst compositions containing the supported catalysts, methods for using the catalyst compositions to polymerize olefins, the polymer resins produced using such catalyst compositions, and articles produced using these polymer resins. In particular, the present invention relates to supported chromium catalysts containing a chromium (III) compound and an activator-support comprising a solid oxide treated with an electron-withdrawing anion, and to catalyst compositions employing these supported chromium catalysts.

Chromium (III) Compounds

Chromium-based catalysts and catalyst systems encompassed herein can comprise a chromium (III) compound (or trivalent chromium compound), or a derivative thereof. For instance, the chromium (III) compound can comprise a chromium (III) 1,3-diketone compound, or a derivative thereof. In some aspects, the chromium (III) compound is a compound containing only chromium, carbon, hydrogen, and oxygen atoms. Accordingly, in other aspects, the chromium (III) compound is not a chromium oxide or other chromium compound that does not contain a carbon atom.

In an aspect, the chromium (III) compound can comprise chromium (III) formate, chromium (III) acetate, chromium (III) propionate, chromium (III) butyrate, chromium (III) pentanoate, chromium (III) neopentanoate, chromium (III) hexanoate, chromium (III) 2-ethylhexanoate, chromium (III) benzoate, chromium (III) naphthenate, chromium (III) oleate, chromium (III) oxalate, chromium (III) acetylacetonate, chromium (III) stearate, chromium (III) laurate, a derivative thereof, or any combination thereof. For instance, the chromium (III) compound can comprise chromium (III) formate; alternatively, chromium (III) acetate; alternatively, chromium (III) propionate; alternatively, chromium (III) butyrate; alternatively, chromium (III) pentanoate; alternatively, chromium (III) neopentanoate; alternatively, chromium (III) hexanoate; alternatively, chromium (III) 2-ethylhexanoate; alternatively, chromium (III) benzoate; alternatively, chromium (III) naphthenate; alternatively, chromium (III) oleate; alternatively, chromium (III) oxalate; alternatively, chromium (III) acetylacetonate; alternatively, chromium (III) stearate; alternatively, chromium (III) laurate; or alternatively, a derivative of any of these chromium (III) compounds.

In another aspect, the chromium (III) compound can comprise chromium (III) 1,3-butanedionate, chromium (III) 2,4-hexanedionate, chromium (III) 2,4-heptanedionate, chromium (III) 2,4-octanedionate, chromium (III) 3,5-octanedionate, chromium (III) benzoylacetonate, chromium (III) 1,3-diphenyl-1,3-propanedionate, chromium (III) 2-methyl-1,3-butanedionate, chromium (III) 2-ethyl-1,3-butanedionate, chromium (III) 2-phenyl-1,3-butanedionate, chromium (III) 1,2,3-triphenyl-1,3-propanedionate, chromium (III) 2,2,6,6-tetramethylheptanedionate, a derivative thereof, or any combination thereof. For instance, the chromium (III) compound can comprise chromium (III) 1,3-butanedionate; alternatively, chromium (III) 2,4-hexanedionate; alternatively, chromium (III) 2,4-heptanedionate; alternatively, chromium (III) 2,4-octanedionate; alternatively, chromium (III) 3,5-octanedionate; alternatively, chromium (III) benzoylacetonate; alternatively, chromium (III) 1,3-diphenyl-1,3-propanedionate; alternatively, chromium (III) 2-methyl-1,3-butanedionate; alternatively, chromium (III) 2-ethyl-1,3-butanedionate; alternatively, chromium (III) 2-phenyl-1,3-butanedionate; alternatively, chromium (III) 1,2,3-triphenyl-1,3-propanedionate; alternatively, chromium (III) 2,2,6,6-tetramethylheptanedionate; or alternatively, a derivative of any of these chromium (III) compounds.

In yet another aspect, the chromium (III) compound can comprise chromium (III) acetylacetonate, chromium (III) 2-ethylhexanoate, chromium (III) naphthenate, a derivative of, or any combination thereof. In still another aspect, the chromium (III) compound can comprise chromium (III) acetylacetonate, or a derivative thereof.

Activator-Supports

The present invention encompasses various catalyst compositions containing an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, and 8,309,485, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, flluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate, or alternatively, fluoride and/or chloride.

The activator-support generally can contain from about 1 to about 25 wt. % of the electron-withdrawing anion, based on the weight of the activator-support. In particular aspects provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an aspect, the supported catalyst can comprise an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another aspect, the activator-support employed in the supported catalyst can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; alternatively, fluorided silica-coated alumina; or alternatively, chlorided/fluorided silica-coated alumina.

Various processes can be used to form activator-supports useful in the present invention. Methods of contacting the solid oxide with the electron-withdrawing component, suitable electron withdrawing components and addition amounts, and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

Co-Catalysts

The catalyst compositions disclosed herein generally contain a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal ($\alpha$), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer, based on the total weight of the monomer and comonomer. According to another aspect of the present invention, the amount of comonomer introduced into a polymerization reactor system can be from about 0.01 to about 40 weight percent comonomer, based on the total weight of the monomer and comonomer, or alternatively, from about 0.1 to about 35 weight percent comonomer, or from about 0.5 to about 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some aspects, the present invention employs catalyst compositions containing a supported chromium catalyst comprising (a) a chromium (III) compound, or a derivative thereof, and (b) an activator-support comprising a solid oxide treated with an electron-withdrawing anion; and a co-catalyst (one or more than one). These catalyst compositions can be utilized to produce polyolefins—homopolymers, copolymers, and the like—for a variety of end-use applications. Chromium (III) compounds and activator-supports are discussed hereinabove. In aspects of the present invention, it is contemplated that the catalyst composition can contain more than one supported chromium catalyst. Further, additional catalytic compounds can be employed in the catalyst compositions and/or the polymerization processes, provided that the additional catalytic compounds do not detract from the advantages disclosed herein.

Generally, catalyst compositions of the present invention comprise a supported chromium catalyst comprising (a) a chromium (III) compound, or a derivative thereof, and (b) an activator-support comprising a solid oxide treated with an electron-withdrawing anion; and a co-catalyst. Suitable co-catalysts, such as organoaluminum compounds, are discussed hereinabove. Thus, a catalyst composition consistent with aspects of the invention can comprise a supported chromium catalyst comprising (or consisting essentially of, or consisting of) chromium (III) acetylacetonate (or chromium (III) 2-ethylhexanoate, or chromium (III) naphthenate, or derivatives thereof) and sulfated alumina (or fluorided silica-alumina, or fluorided silica-coated alumina); and triethylaluminum (or triisobutylaluminum). The chromium compound in the supported chromium catalyst and resultant catalyst composition includes "a derivative thereof" to encompass situations where, for instance, during formation of the supported catalyst and/or catalyst composition, the chromium (III) compound may lose one ligand (or more ligands), and therefore, may not be chemically the same as the initial/starting chromium (III) material used to prepare the supported catalyst. For example, during the formation of the catalyst system, the chromium (III) compound may lose a ligand and/or may be reduced to a chromium (II) form after contacting a co-catalyst, such as triisobutylaluminum (TIBA).

Consistent with aspects of this invention, the weight percentage of chromium of the chromium (III) compound, based on the weight of the activator-support, often can be in a range from about 0.1 to about 10 wt. %. For example, the weight percentage can be in a range from about 0.25 to about 10 wt. % Cr, from about 0.1 to about 5 wt. % Cr, or from about 0.25 to about 5 wt. % Cr. In certain aspects, the weight percentage of chromium in the chromium (III) compound, based on the weight of the activator-support, can be in a range from about 0.5 to about 5 wt. %, from about 0.5 to about 2 wt. %, from about 0.5 to about 1.5 wt. %, from about 0.75 to about 2.5 wt. %, or from about 0.75 to 1.5 wt. % Cr.

In the catalyst composition, the ratio of the moles of co-catalyst (e.g., an organoaluminum compound) to the moles of chromium in the supported catalyst typically can be in a range from about 0.1:1 to about 10,000:1. More typically, the molar ratio of co-catalyst:chromium can be in a range from about 1:1 to about 1000:1, from about 1:1 to about 500:1, from about 10:1 to about 1000:1, or from about 50:1 to about 500:1.

Catalyst compositions of the present invention generally have a catalyst activity greater than about 500 grams of ethylene polymer (e.g., ethylene homopolymer, ethylene copolymer, as the context requires) per gram of supported chromium catalyst per hour (abbreviated g/g/h). In an aspect, the catalyst activity can be greater than about 750, greater than about 850, or greater than about 1000 g/g/h. In another aspect, catalyst compositions of this invention can be characterized by having a catalyst activity greater than about 1500, greater than about 2000, greater than about 3000, greater than about 4000, or greater than about 5000 g/g/h, and often can range up to about 6000-10,000 g/g/h. These activities are measured under slurry polymerization conditions, with a triisobutylaluminum (TIBA) co-catalyst, using isobutane as the diluent, at a polymerization temperature of 100° C. and a reactor pressure of about 550 psig. Additionally, in some aspects, the activator-support can be sulfated alumina, fluorided silica-alumina, or fluorided silica-coated alumina, although not limited thereto.

Unexpectedly, catalyst compositions of the present invention can tolerate much higher levels of co-catalyst than catalyst systems employing Cr(VI), and still maintain acceptable catalyst activity. In one aspect, for example, catalyst compositions with a molar ratio of organoaluminum:chromium in a range from about 10:1 to about 1000:1 (e.g., 100:1) can have a catalyst activity greater than about 500 g/g/h, while in another aspect, the catalyst composition can have a catalyst activity of greater than about 750, or greater than about 1000 g/g/h. These activities are measured under slurry polymerization conditions, with an organoaluminum co-catalyst (e.g., at a TIBA:Cr molar ratio of 100:1), using isobutane as the diluent, at a polymerization temperature of 100° C. and a reactor pressure of about 550 psig.

In some aspects of this invention, the catalyst composition can comprise a supported chromium catalyst, a co-catalyst, and a metallocene compound. The metallocene compound can be any suitable bridged and/or unbridged metallocene compound, such as disclosed in U.S. Pat. Nos. 7,026,494, 7,041,617, 7,199,073, 7,226,886, 7,312,283, 7,517,939, 7,619,047, 7,863,210, 7,919,639, 8,012,900, and 8,080,681, which are incorporated herein by reference in their entirety. Generally, the relative amounts of chromium (in the supported catalyst) and transition metal (in the metallocene compound) are not limited to any particular range. However, in certain aspects, the molar ratio of chromium:transition metal can be in a range from about 1:20 to about 20:1, from about 1:10 to about 10:1, from about 1:5 to about 5:1, from about 1:4 to about 4:1, from about 1:3 to about 3:1, from about 1:2 to about 2:1, from about 1:1.5 to about 1.5:1, or from about 1:1.2 to about 1.2:1.

This invention further encompasses methods of making the disclosed catalyst compositions, such as, for example, by contacting the respective catalyst components in any order or sequence, and moreover, also encompasses methods for making the disclosed supported chromium catalysts. For example, one such method of making a supported chromium catalyst can comprise (i) combining a chromium (III) compound with an activator-support comprising a solid oxide treated with an electron-withdrawing anion to form a mixture; and (ii) subjecting (e.g., exposing, treating, etc.) the mixture to a non-oxidizing atmosphere at a peak temperature to produce the supported chromium catalyst. Chromium (III) compounds and activator-supports are discussed hereinabove.

In one aspect, step (i) comprises dry mixing the activator-support with the chromium (III) compound, and step (ii) comprises subjecting the mixture to the non-oxidizing atmosphere at a peak temperature sufficient for at least a portion of the chromium (III) compound to sublime (or vaporize) and impregnate the activator-support. In another aspect, step (i) comprises mixing the activator-support with the chromium (III) compound in a solvent, and step (ii) comprises subjecting the mixture to the non-oxidizing atmosphere at a peak temperature sufficient to remove the solvent. Other suitable processes and procedures for combining the chromium (III) compound and the activator-support, and for subjecting the combination to the non-oxidizing atmosphere at the peak temperature, would be readily apparent to those of skill in the art based on this disclosure and, accordingly, are encompassed herein.

Step (i) can be conducted at a wide range of temperatures depending, for instance, on the method used to combine the activator-support and the chromium (III) compound (e.g., dry blend, with a solvent, etc.). While not being limited to any particular temperature range, step (i) often can be conducted at temperature in a range from about 0° C. to about 100° C., from about 10° C. to about 100° C., from about 20° C. to about 100° C., from about 0° C. to about 75° C., from about 10° C. to about 75° C., from about 20° C. to about 75° C., from about 10° C. to about 50° C., or from about 20° C. to about 50° C.

Likewise, step (ii) can be conducted at a wide range of peak temperatures depending, for instance, on the type of mixture resulting from step (i). While not being limited thereto, the peak temperature can be in a range from about 0° C. to about 600° C., from about 25° C. to about 600° C., from about 10° C. to about 100° C., from about 20° C. to about 100° C., from about 10° C. to about 500° C., from about 50° C. to about 450° C., from about 100° C. to about 400° C., from about 100° C. to about 350° C., from about 150° C. to about 350° C., or from about 200° C. to about 300° C. In these and other aspects, these peak temperature ranges also are meant to encompass circumstances where step (ii) is conducted at a series of different temperatures (e.g., an initial lower temperature, a higher peak temperature), instead of at a single fixed temperature, falling within the respective ranges. For instance, step (ii) can start at a lower temperature (such as the temperature used in step (i)), and subsequently, the temperature of step (ii) can be increased to the peak temperature, for example, a peak temperature in a range from about 10° C. to about 600° C., or from about 100° C. to about 550° C.

Step (ii) can be conducted over a wide range of time periods depending, for instance, on the peak temperature. While not being limited thereof, step (ii) often can be conducted for a time period in a range from about 5 minutes to about 24-48 hours, from about 10 minutes to about 24 hours, from about 30 minutes to about 12 hours, from about 30 minutes to about 9 hours, from about 1 hour to about 12 hours, from about 1 hour to about 6 hours, or from about 2 hours to about 6 hours.

Importantly, the mixture of the activator-support and the chromium (III) compound, in step (ii), can be subjected to a non-oxidizing atmosphere (e.g., no oxygen). In one aspect, the non-oxidizing atmosphere is an inert atmosphere, while in another aspect, the non-oxidizing atmosphere is a reducing atmosphere. Hence, in some aspects, the non-oxidizing atmosphere can be an inert atmosphere comprising (or consisting essentially of, or consisting of) nitrogen, neon, argon, and the like, as well as combinations thereof. Additionally or alternatively, the non-oxidizing atmosphere can comprise a vacuum (or other reduced pressure), for instance, to remove solvent to dry a wet mixture prepared in step (i). In other aspects, the non-oxidizing atmosphere can be a reducing atmosphere comprising (or consisting essentially of, or consisting of) $H_2$, CO, and the like, as well as combinations thereof.

In step (ii) of the process to produce a supported chromium catalyst, subjecting the mixture (e.g., exposing the mixture, treating the mixture, etc.) to the non-oxidizing atmosphere at the peak temperature allows the chromium (III) compound to be adsorbed and/or impregnated and/or deposited onto the activator-support, thus resulting in the supported chromium catalyst. During this process, the initial/starting chromium (III) compound may lose one ligand (or more ligands); therefore, the chromium (III) compound is meant to encompass such "derivatives" of the chromium (III) compound.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise a supported chromium catalyst comprising (a) a chromium (III) compound, or a derivative thereof, and (b) an activator-support comprising a solid oxide treated with an electron-withdrawing anion; and a co-catalyst (one or more than one). Suitable chromium (III) compounds, activator-supports, and co-catalysts are discussed herein. Thus, a process for polymerizing olefins in the presence of a catalyst composition can employ a catalyst composition comprising a supported chromium catalyst comprising (or consisting essentially of, or consisting of) chromium (III) acetylacetonate (or chromium (III) 2-ethylhexanoate, or chromium (III) naphthenate, or derivatives thereof) and sulfated alumina (or fluorided silica-alumina, or fluorided silica-coated alumina); and triethylaluminum (or triisobutylaluminum).

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., from about 80° C. to about 110° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and, optionally, an olefin comonomer under polymerization conditions to produce an olefin polymer. The olefin polymer (e.g., ethylene homopolymer, ethylene copolymer, etc.) produced by the process can have any of the polymer properties disclosed herein, for example, a Mw in a range from about 400,000 to about 900,000 g/mol, and/or a ratio of Mw/Mn of greater than or equal to about 70, and/or a relaxation time of less than or equal to about 100 sec, and/or less than or equal to about 0.001 LCB per 1000 total carbon atoms, and/or a HLMI of less than or equal to about 1 g/10 min.

Aspects of this invention also are directed to olefin polymerization processes conducted in the absence of added hydrogen. An olefin polymerization process of this invention can comprise contacting a catalyst composition with an olefin monomer and optionally an olefin comonomer in a polymerization reactor system under polymerization conditions to produce an olefin polymer, wherein the catalyst composition can comprise a supported chromium catalyst and a co-catalyst, and wherein the polymerization process is conducted in the absence of added hydrogen (no hydrogen is added to the polymerization reactor system). As one of ordinary skill in the art would recognize, hydrogen can be generated in-situ by certain catalyst compositions in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition with an olefin monomer and optionally an olefin comonomer in a polymerization reactor system under polymerization conditions to produce an olefin polymer, wherein the catalyst composition comprises a supported chromium catalyst and a co-catalyst, and wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

Unexpectedly, the catalyst compositions and polymerization processes of the present invention can be much more sensitive to hydrogen than comparable catalyst systems and processes employing Cr(VI). In one aspect, for example, an increase in the melt index of the olefin polymer with the addition of 1 mol % hydrogen (from 0 to 1 mol %, using the catalyst compositions and polymerization processes described herein) can be greater than the increase in the melt index of an olefin polymer obtained using a Cr(VI)/silica catalyst system, under the same polymerization conditions. In another aspect, the melt index of an olefin polymer produced by the process in the presence of 0.5 mol % hydrogen (based on olefin monomer) can be greater than the melt index of an olefin polymer obtained using a Cr(VI)/silica catalyst system, under the same polymerization conditions. The Cr(VI) catalyst generally is calcined in an oxidizing atmosphere at 600° C., and the polymerization conditions can include slurry polymerization conditions, with a TIBA co-catalyst, using isobutane as the diluent, at a polymerization temperature of 100° C. and a reactor pressure of about 550 psig.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

An illustrative and non-limiting example of an ethylene polymer of the present invention can have a Mw in a range from about 400,000 to about 900,000 g/mol (or from about 300,000 to about 1,000,000 g/mol); a ratio of Mw/Mn of greater than or equal to about 70 (or greater than or equal to about 35, or greater than or equal to about 50, or greater than or equal to about 90); and a relaxation time of less than or equal to about 100 sec (or less than or equal to about 70 sec, or less than or equal to about 120 sec).

Another illustrative and non-limiting example of an ethylene polymer of the present invention can have a Mw in a range from about 400,000 to about 900,000 g/mol (or from about 300,000 to about 1,000,000 g/mol); a ratio of Mw/Mn of greater than or equal to about 70 (or greater than or equal to about 35, or greater than or equal to about 50, or greater than or equal to about 90); and less than or equal to about 0.001 LCB per 1000 total carbon atoms (or less than or equal to about 0.005 LCB per 1000 total carbon atoms, or less than or equal to about 0.002 LCB per 1000 total carbon atoms).

Yet another illustrative and non-limiting example of an ethylene polymer of the present invention can have a HLMI of less than or equal to about 1 g/10 min (or less than or equal to about 5 g/10 min, or less than or equal to about 10 g/10 min); a ratio of Mw/Mn of greater than or equal to about 70 (or greater than or equal to about 35, or greater than or equal to about 50, or greater than or equal to about 90); and less than or equal to about 0.001 LCB per 1000 total carbon atoms (or less than or equal to about 0.005 LCB per 1000 total carbon atoms, or less than or equal to about 0.002 LCB per 1000 total carbon atoms).

These illustrative and non-limiting examples of ethylene polymers consistent with the present invention also can have any of the polymer properties listed below and in any combination. Moreover, in particular aspects contemplated herein, these ethylene-based polymers can have a unimodal molecular weight distribution.

Polymers of ethylene (homopolymers, copolymers, terpolymers, etc.) produced in accordance with some aspects of this invention generally can have a melt index (MI) from 0 to about 100 g/10 min. Melt indices in the range from 0 to about 50 g/10 min, from 0 to about 20 g/10 min, or from 0 to about 10 g/10 min, are contemplated in other aspects of this invention. For example, a polymer of the present invention can have a melt index in a range from 0 to about 5, from 0 to about 3, from 0 to about 1, from 0 to about 0.5, from 0 to about 0.25, or from 0 to about 0.1 g/10 min.

Ethylene polymers produced in accordance with this invention can have a high load melt index (HLMI) of less than or equal to about 1000, less than or equal to about 500, less than or equal to about 100, less than or equal to about 10, less than or equal to about 5, or less than or equal to about 1 g/10 min. Suitable ranges for the HLMI can include, but are not limited to, from 0 to about 100, from 0 to about 25, from 0 to about 10, from 0 to about 5, from 0 to about 3, from 0 to about 2, from 0 to about 1.5, from 0 to about 1, from 0 to about 0.75, or from 0 to about 0.5 g/10 min.

The densities of ethylene-based polymers produced using the catalyst systems and processes disclosed herein often are greater than or equal to about 0.89 g/cm$^3$. In one aspect of this invention, the density of the ethylene polymer can be in a range from about 0.90 to about 0.97 g/cm$^3$. Yet, in another aspect, the density can be in a range from about 0.91 to about 0.96 g/cm$^3$, such as, for example, from about 0.92 to about 0.96 g/cm$^3$, from about 0.93 to about 0.955 g/cm$^3$, or from about 0.94 to about 0.95 g/cm$^3$.

In an aspect, ethylene polymers described herein can have a ratio of Mw/Mn, or the polydispersity index, of greater than or equal to about 25, greater than or equal to about 35, greater than or equal to about 50, greater than equal to about 70, greater than or equal to about 90, or greater than or equal to about 100. Often, the Mw/Mn can range up to about 150-200, therefore, non-limiting ranges for Mw/Mn include from about 25 to about 200, from about 35 to about 200, from about 50 to about 200, from about 70 to about 200, from about 90 to about 200, from about 25 to about 150, from about 35 to about 150, from about 50 to about 150, from about 70 to about 150, or from about 90 to about 150.

In an aspect, ethylene polymers described herein can have a ratio of Mz/Mw in a range from about 1.5 to about 10, from about 2 to about 10, from about 2 to about 8, from about 2.5 to about 8, from about 3 to about 10, or from about 3 to about 8. In another aspect, ethylene polymers described herein can have a Mz/Mw in a range from about 2 to about 7, from about 2 to about 6, from about 2 to about 5, or from about 2 to about 4.

In an aspect, ethylene polymers described herein can have a weight-average molecular weight (Mw) in a range from about 200,000 to about 5,000,000, from about 200,000 to about 2,000,000, from about 300,000 to about 1,500,000, from about 300,000 to about 1,000,000, from about 400,000 to about 2,000,000, or from about 400,000 to about 1,000,000 g/mol. In another aspect, ethylene polymers described herein can have a Mw in a range from about 400,000 to about 900,000, from about 450,000 to about 1,000,000, or from about 500,000 to about 900,000 g/mol.

In an aspect, ethylene polymers described herein can have a number-average molecular weight (Mn) in a range from about 2,000 to about 60,000, from about 2,000 to about 50,000, from about 2,000 to about 25,000, from about 2,000 to about 20,000, from about 3,000 to about 50,000, or from about 3,000 to about 25,000 g/mol. In another aspect, ethylene polymers described herein can have a Mn in a range from about 3,000 to about 20,000, from about 3,000 to about 19,000, from about 4,000 to about 45,000, from about 4,000 to about 25,000, or from about 4,000 to about 15,000 g/mol.

In an aspect, ethylene polymers described herein can have a z-average molecular weight (Mz) in a range from about 500,000 to about 6,000,000, from about 1,000,000 to about 6,000,000, from about 1,500,000 to about 6,000,000, from about 1,000,000 to about 5,000,000, from about 1,000,000 to about 4,500,000, or from about 1,500,000 to about 4,000,000 g/mol. In another aspect, ethylene polymers described herein can have a Mz in a range from about 2,000,000 to about 5,000,000, from about 2,000,000 to about 4,500,000, from about 2,000,000 to about 4,000,000, or from about 2,000,000 to about 3,500,000 g/mol.

Generally, polymers produced in aspects of the present invention have low levels of long chain branching, with typically less than or equal to about 0.01 long chain branches (LCB) per 1000 total carbon atoms, and more often, less than or equal to about 0.008 LCB per 1000 total carbon atoms, or less than or equal to about 0.005 LCB per 1000 total carbon atoms, as determined by the Janzen-Colby method. In some aspects, the number of LCB per 1000 total carbon atoms can be less than or equal to about 0.003, or less than or equal to about 0.002 LCB per 1000 total carbon atoms. Further, the olefin polymer can have less than or equal to about 0.001 LCB per 1000 total carbon atoms in particular aspects of this invention. Surprisingly, olefin polymers (e.g., ethylene polymers) produced using the catalyst systems and polymerization processes described herein can the lowest levels of LCB recorded for a chromium-based catalyst system. Long chain branches (LCB) per 1000 total carbon atoms can be determined using the Janzen-Colby method as described in *J. Mol. Struct.*, 485/486, 569-584 (1999); see also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Ethylene copolymers, for example, produced using the polymerization processes and catalyst systems described hereinabove can, in some aspects, have a conventional comonomer distribution; generally, the lower molecular weight components of the polymer have higher comonomer incorporation than the higher molecular weight components. Typically, there is decreasing comonomer incorporation with increasing molecular weight. In one aspect, the number of short chain branches (SCB) per 1000 total carbon atoms of the polymer can be greater at Mn than at Mz. In another aspect, the number of SCB per 1000 total carbon atoms of the polymer can be greater at Mn than at Mw.

In an aspect, ethylene polymers described herein can have a relaxation time of less than or equal to about 500 sec, less than or equal to about 200 sec, or less than or equal to about 150 sec (determined by the Carreau-Yasuda method, as described herein). In another aspect, the relaxation time can be less than or equal to about 120 sec, or less than or equal to about 100 sec. Yet, in another aspect, the ethylene polymer can have a relaxation time of less than or equal to about 85 sec, less than or equal to about 75 sec, less than or equal to about 70 sec, less than or equal to about 50 sec, or less than or equal to about 40 sec. Often, the relaxation time for polymers described herein can be greater than or equal to about 20 sec. Moreover, in some aspects, the relaxation times for polymers disclosed herein can be shorter than for comparable (same Mw) polymers produced using a chromium (VI) catalyst system.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise a supported chromium (III) catalyst and a co-catalyst; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight.

Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 µL was used. The integral calibration method was used to deduce molecular weights and molecular weight distributions using a Chevron Phillips Chemicals Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—$\alpha$. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:

|η*(ω)|=magnitude of complex shear viscosity;
$\eta_0$=zero shear viscosity;
$\tau_n$=viscous relaxation time;
α="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987); each of which is incorporated herein by reference in its entirety.

The long chain branches (LCB) per 1000 total carbon atoms were calculated using the method of Janzen and Colby (*J. Mol. Struct.*, 485/486, 569-584 (1999)), from values of zero shear viscosity, $\eta_o$ (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A thermoelectric-cooled IRS MCT detector (IRS) (Polymer Char, Spain) was connected to the GPC columns via a hot-transfer line. Chromatographic data were obtained from two output ports of the IRS detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IRS detector sample cell were set at 150° C., while the temperature of the electronics of the IRS detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Silica, grade EP10 from Philadelphia Quartz, was calcined in dry air at 600° C. for three hours. Alumina, grade A from W.R. Grace Co., was calcined in dry air at 600° C. for three hours. Aluminophosphate was prepared by co-precipitation as described in U.S. Pat. No. 4,364,855, to contain a P/Al molar ratio of 0.9, 0.6, or 0.2, as indicated, followed by calcining in dry air for three hours at 600° C.

Fluorided silica-coated aluminas were prepared as follows. Bohemite was obtained from W.R. Grace & Company under the designation "Alumina A" and having a surface area of about 300 m²/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. (unless otherwise noted) in dry air. Afterward, the fluorided silica-coated alumina was collected and stored under dry nitrogen, and was used without exposure to the atmosphere.

Silica-coated alumina samples that were treated with both chloride and fluoride were made as follows. First, Alumina A was treated with silicon tetraethoxide as described above.

Then, this material was heated in dry air to 600° C., where it was treated with carbon tetrachloride vapor (0.2 g CCl$_4$/g alumina), followed by a treatment with tetrafluoroethane vapor to result in a F loading of 7 wt. % F.

Hexavalent chromium catalysts (Examples 35-37) were prepared by impregnating the support (silica, alumina, or silica-coated alumina) with an aqueous solution of chromium trioxide to equal a final chromium loading of 1 wt. % Cr. These catalysts were then calcined at the specified temperature (600 or 700° C.) in dry air (an oxidizing atmosphere) in order to maintain the chromium in the hexavalent state.

Sulfated alumina activator-supports were prepared as follows. Bohemite was obtained from W.R. Grace & Company under the designation "Alumina A" and having a surface area of about 300 m$^2$/g and a pore volume of about 1.3 mL/g. This material was obtained as a powder having an average particle size of about 100 microns. This material was impregnated to incipient wetness with an aqueous solution of ammonium sulfate to equal about 1.5 mmol/g or 3.6 mmol/g sulfate. This mixture was then placed in a flat pan and allowed to dry under vacuum at approximately 110° C. for about 16 hours. To calcine the resultant powdered mixture, the material was fluidized in a stream of dry air at about 400° C. or 600° C., as noted, for 3 hours. Afterward, the sulfated alumina was collected and stored under dry nitrogen, and was used without exposure to the atmosphere.

Fluorided silica-alumina was prepared from a support containing 13 wt. % alumina, a surface area of 450 m$^2$/g, and a pore volume of 1.3 mL/g After impregnation with an aqueous solution of ammonium bifluoride to contain 7 wt. % fluoride, the material was dried and then calcined at 450° C. for three hours.

Chlorided zinc-aluminate was prepared by impregnating the same alumina described above with 1.5 mmol/g of zinc acetate. After drying, it was calcined at 600° C. in nitrogen. During the calcination of 10 g of this support, 1 mL of carbon tetrachloride was added and vaporized into the nitrogen. Then, the support was collected in a sealed nitrogen-blanketed bottle.

Fluorided silica-coated Ti-alumina was prepared from the same alumina as described above. The calcined (600° C.) Alumina A was first slurried in dry isopropanol, to which was added enough titanium tetraisopropoxide to yield 8 wt. % TiO$_2$ upon calcination. Then, silicon tetraethoxide was added to yield 25 wt. % SiO$_2$ upon calcination. The solvent was evaporated, and the dried support was calcined at 500° C. in air for 3 hours. During the calcination, perfluorohexane was injected into the air source to equal 7 wt. % F.

The support or activator-support materials in Table I were calcined at the respective temperature listed in Table I for 3 hours, as described above. Then, at room temperature, each support or activator-support material was impregnated with a toluene solution of chromium (III) acetylacetonate (Cr(AcAc)$_3$) to equal 2 wt. % Cr, followed by heating at 110° C. in N$_2$ for 1 hour. The resultant supported chromium catalyst was used in polymerization experiments conducted in a 2-L stainless steel reactor. Isobutane (1.2 L) was used in all runs. Approximately 0.05-0.10 g of the supported chromium catalyst and 1 mmol of triisobutylaluminum (TIBA) were added through a charge port while slowly venting isobutane vapor. The charge port was closed and the isobutane was added. The contents of the reactor were stirred and heated to the desired run temperature of about 100° C., and ethylene was then introduced into the reactor. Ethylene was fed on demand to maintain a concentration of 1.7 mol/liter (based on isobutane volume), which was a reactor pressure of about 550 psig, for the 60 minute length of the polymerization run. The reactor was maintained at the desired run temperature throughout the run by an automated heating-cooling system. Table I summarizes certain polymer properties and catalyst activities relating to the polymerization experiments of Examples 1-9. Unexpectedly, the catalyst activities for Examples 5-7, which utilized certain fluorided or sulfated solid oxide activator-supports, were an order of magnitude higher than the catalyst activities using conventional solid oxide materials (catalyst activity in grams of polyethylene per gram of supported chromium catalyst per hour). Additionally, as shown in Table I, the polymers produced had surprisingly high molecular weights and broad molecular weight distributions (e.g., HLMI less than 10, Mw from 400,000 to 800,000 g/mol, Mz around 3,000,000 to 3,500,000 g/mol, and Mw/Mn from about 65 to about 100).

The support or activator-support materials in Table II were calcined at the respective temperature listed in Table II for 3 hours, as indicated above. Then, at room temperature, each support or activator-support material was dry mixed with Cr(AcAc)$_3$ to equal 2 wt. % Cr (unless noted otherwise), followed by heating at 120-250° C. in N$_2$ for 1 hour. The resultant supported chromium catalyst was used in polymerization experiments as described above for Examples 1-9. Table II summarizes certain polymer properties and catalyst activities relating to the polymerization experiments of Examples 10-37. Similar to Table I, and unexpectedly, the catalyst activities for Examples 22-34, which utilized certain activator-supports, were generally higher than the catalyst activities using conventional solid oxide materials (catalyst activity in grams of polyethylene per gram of supported chromium catalyst per hour). In particular, the activities for Examples 22-27 and 33-34 ranged from about 2500 to about 7000 g/g/hr. Analogously to Table I, the polymers in Table II also had surprisingly high molecular weights and broad molecular weight distributions.

Relaxation time data in Table I and Table II demonstrate the unexpectedly low relaxation time for the polymers produced using the Cr(III)/activator-support based catalyst systems. The relaxation times for the polymers of Examples 5-9 generally were in the 50-80 second range, and the relaxation times for the polymers of Examples 22-28 and 31-34 generally were in the 30-85 second range. In contrast, the polymers of Examples 35-37, produced using chromium (VI) catalyst systems, had relaxation times in the 135-300 second range.

Regarding FIG. 1, fluorided silica-coated alumina, described above in Table I and Table II, was dry mixed with Cr(AcAc)$_3$ as described above (2 wt. % Cr), and then calcined at various temperatures between 150° C. and 600° C. in either nitrogen, carbon monoxide, or hydrogen. FIG. 1 illustrates the catalyst activity obtained from these catalysts in polymerization experiments as described above for Examples 1-9 (100° C. and 550 psig). Generally, peak temperatures in the 200-400° C. range resulted in the highest catalyst activity. Catalyst activities listed are in grams of polyethylene per gram of supported chromium catalyst per hour.

Figure 2:
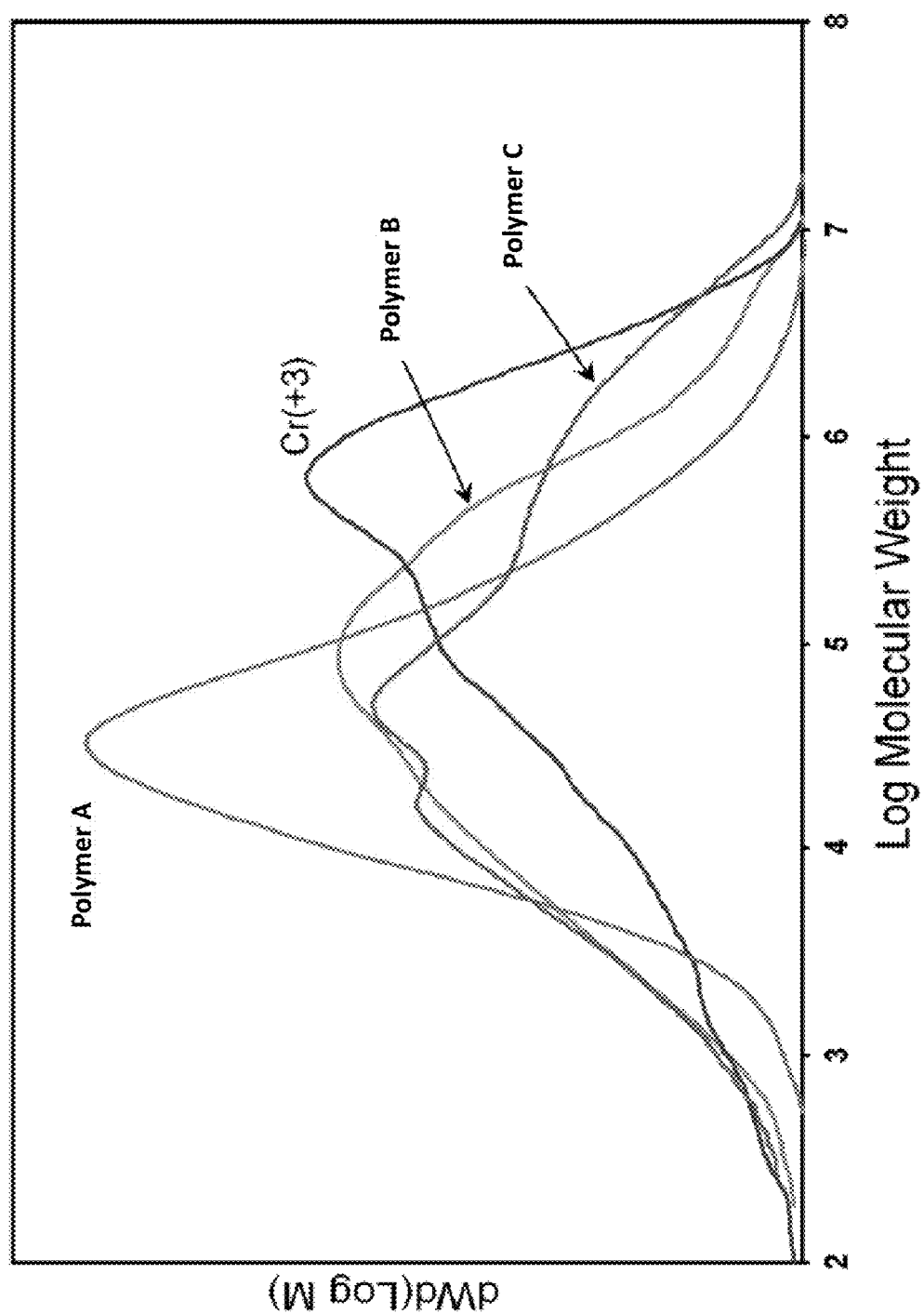
FIG. 2 presents a plot of the molecular weight distributions of the polymers of Example 5 and three commercial resins made from Cr(VI) catalyst systems.

FIG. 2 illustrates a typical molecular weight distribution (amount of polymer versus the logarithm of molecular weight) of a polymer produced using the catalyst systems described herein (labeled Cr(+3), Example 5 with fluorided silica-coated alumina). It is compared to three standard commercially-available chromium-based polymers. The polymer with the narrow peak (Polymer A) had a nominal 0.35 melt index and 0.955 density, and was made with Cr(VI)/silica catalyst calcined at 780° C. The other two curves show Cr(VI) catalysts which produce a very broad MWD. The MWD curve labeled Polymer C was for a polymer having a nominal 4 HLMI and 0.949 density, which was made under similar conditions (100° C., 550 psig) using a Cr(VI)/aluminophosphate catalyst according to U.S. Pat. No. 6,525,148. The MWD curve labeled Polymer B was for a nominal 10 HLMI and 0.947 density polymer, which was made with Cr(VI)/silica-titania. Thus, FIG. 2 demonstrates the high molecular weight and broad distribution polymers produced in accordance with this invention.

Figure 3:
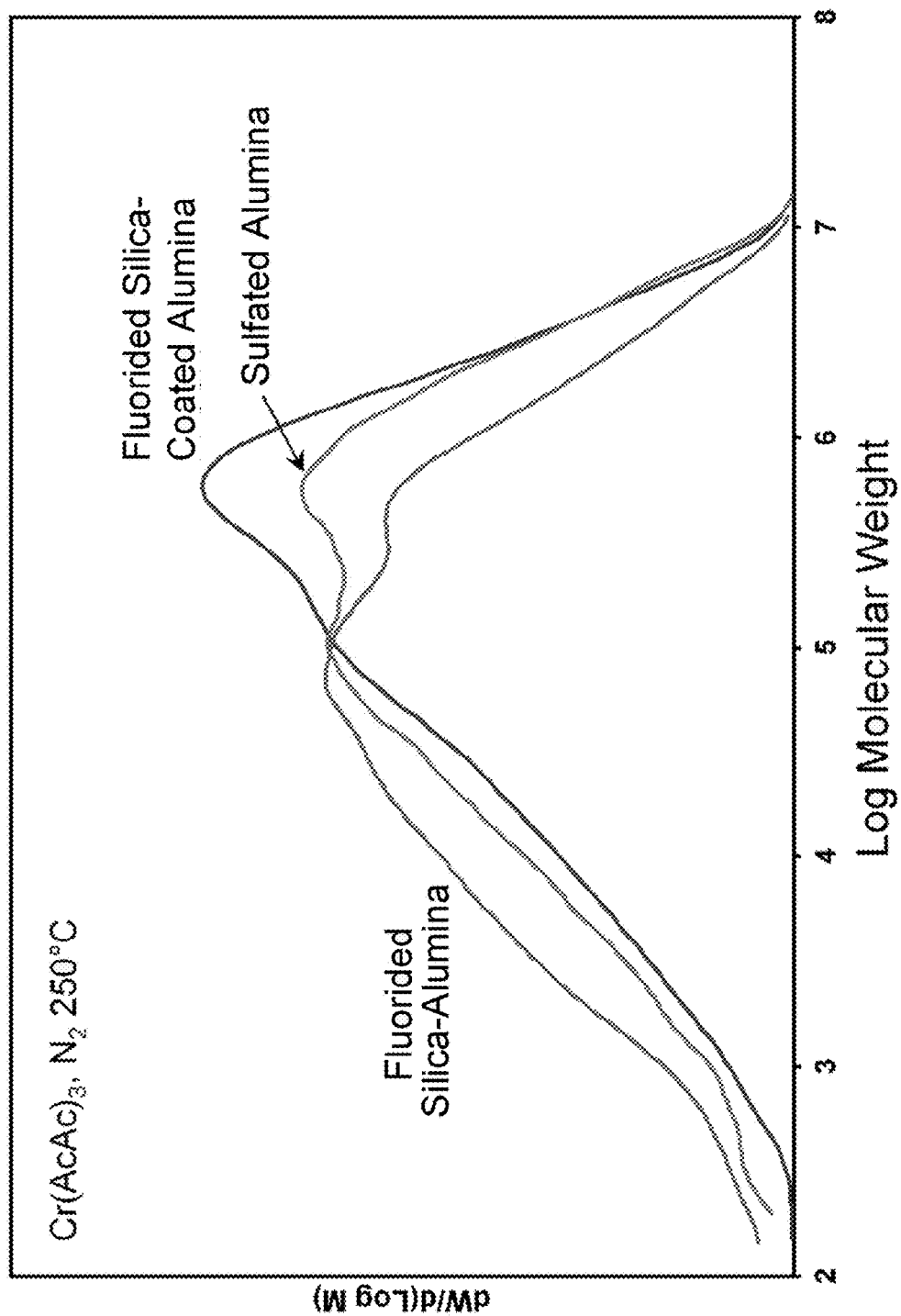
FIG. 3 presents a plot of the molecular weight distributions of polymers produced using different activator-supports.

FIG. 3 illustrates that the high molecular weight and broad distribution polymers described herein can be produced using different activator-supports, and the support can influence the MWD. Three activator-supports were used: fluorided silica-coated alumina, fluorided silica-alumina, and sulfated alumina. In each case, the support was impregnated with a toluene solution of $Cr(AcAc)_3$ as described above, and heated in nitrogen at 250° C. Polymerization conditions were as described above for Examples 1-9 (100° C., 550 psig, 1 mmol TIBA, etc.).

Figure 4:
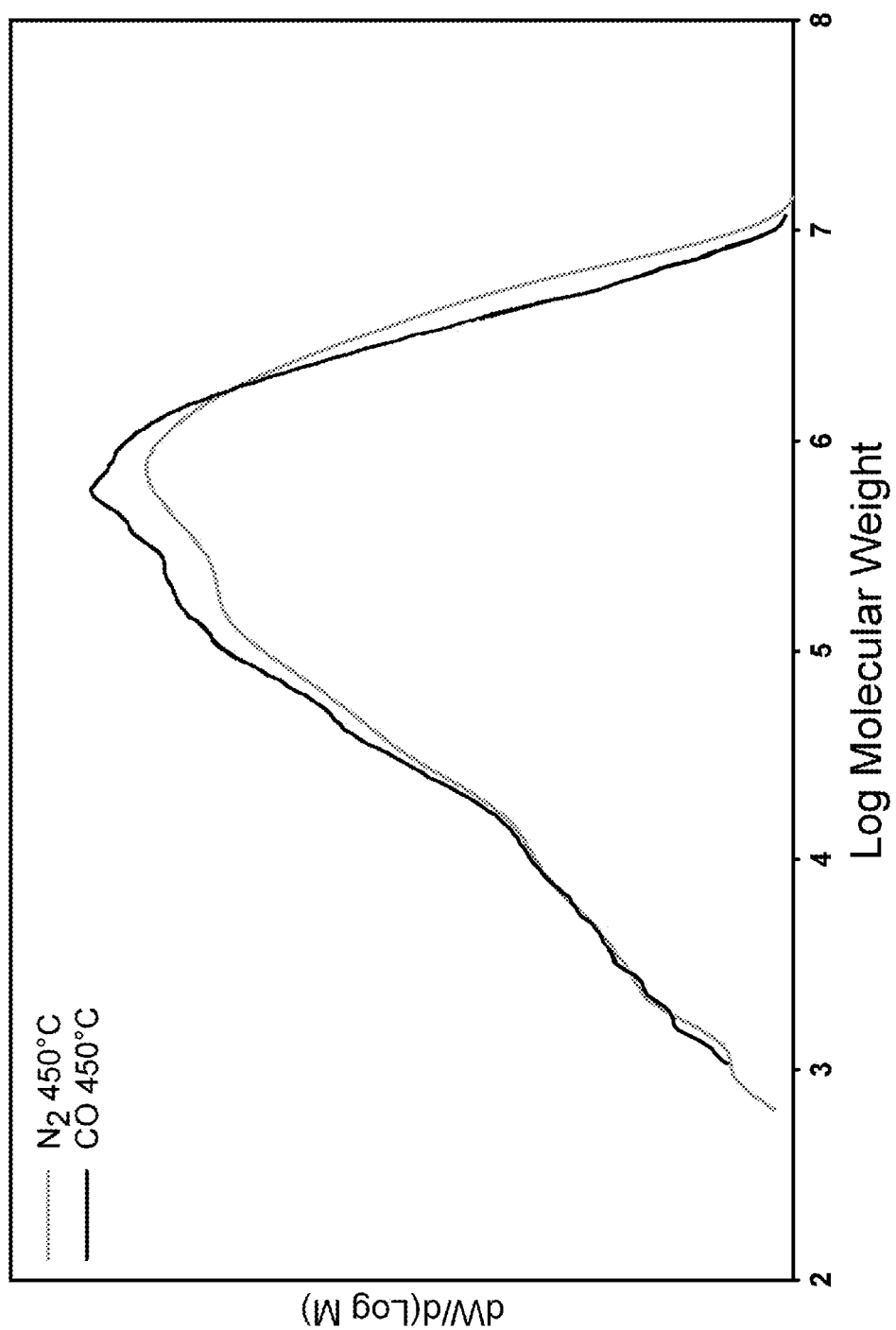
FIG. 4 presents a plot of the molecular weight distributions of polymers produced using $Cr(AcAc)_3$ supported on fluorided silica-coated alumina, which was treated at 450° C. using inert or reducing atmospheres.

FIG. 4 illustrates that the high molecular weight and broad distribution polymers described herein can be produced using supported catalysts exposed to different non-oxidizing atmospheres: $N_2$ and CO. These catalysts were prepared by dry mixing $Cr(AcAc)_3$ with fluorided silica-coated alumina to equal 2 wt. % Cr, then heating the catalyst in either $N_2$ or CO at 450° C. for 1 hour. Polymerization conditions were as described above for Examples 1-9.

Figure 5:
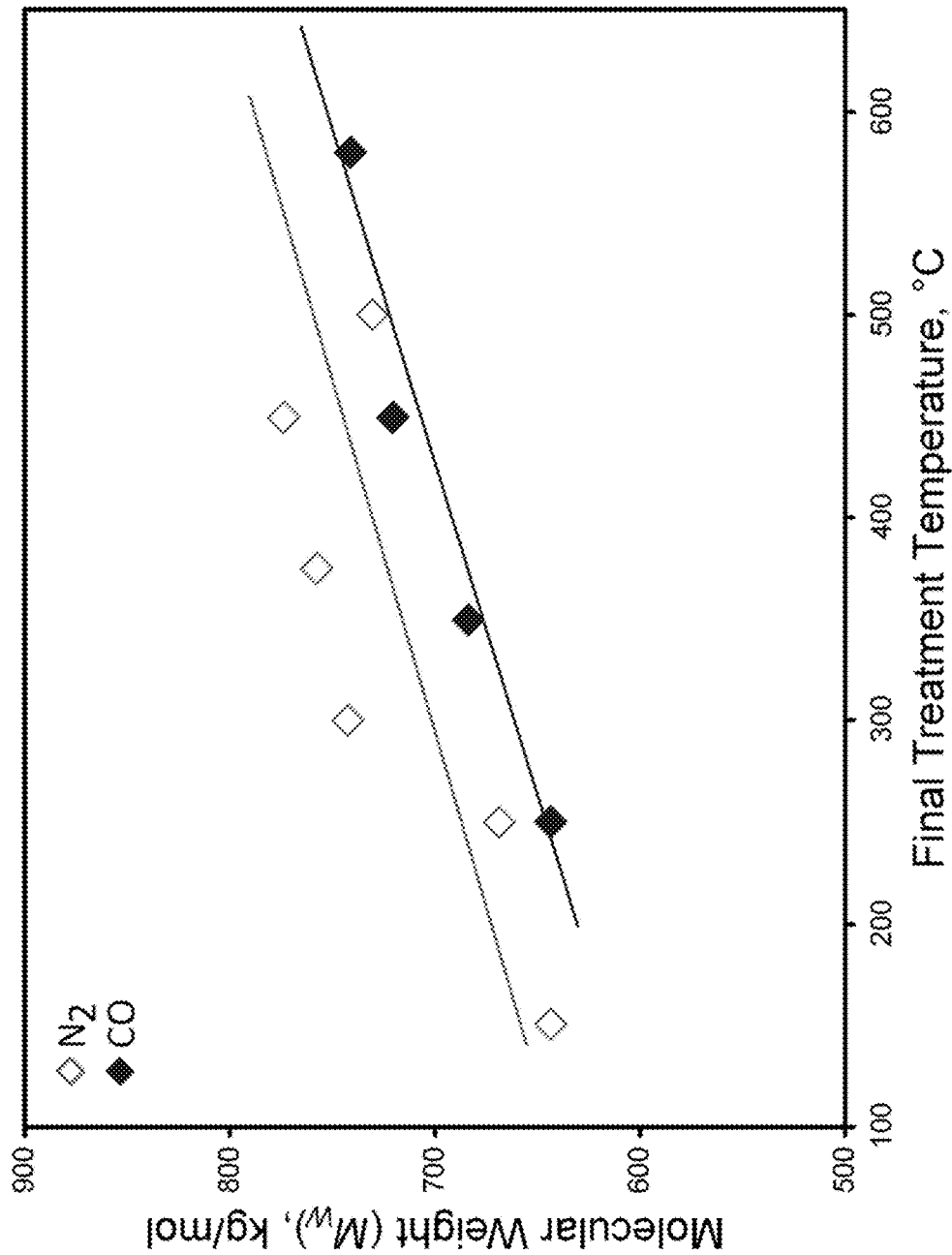
FIG. 5 presents a plot of the weight-average molecular weight (Mw) versus the final (peak) treatment temperature for the catalyst system of Example 25, in which the treatment temperature was varied, using inert or reducing atmospheres.

FIG. 5 illustrates the impact of the peak treatment temperature used to prepare the supported catalyst on the weight-average molecular weight (Mw). The catalyst system of Example 25 was treated in either a $N_2$ or CO atmosphere at various temperatures, and polymerization conditions were as described above for Examples 1-9. Surprisingly, the Mw increased with increasing temperature, which is opposite to the behavior of Cr(VI) catalysts (see McDaniel, Advances in Catalysis, 2010, Chapter 3, incorporated herein by reference). Also unexpectedly, the nitrogen treatment resulted in higher molecular weights than carbon monoxide treatment, at each temperature tested.

Figure 6:
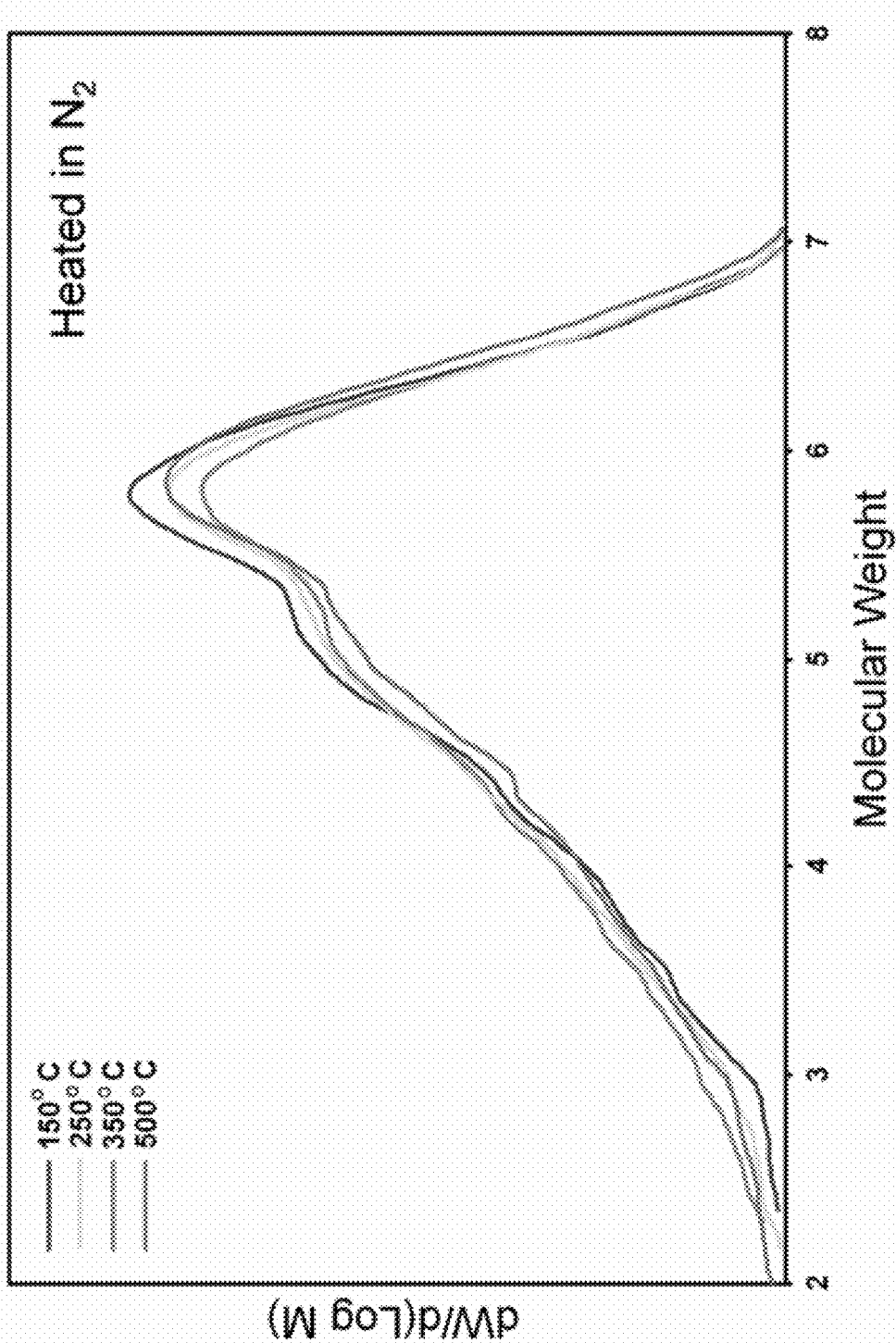
FIG. 6 presents a plot of the molecular weight distributions of polymers made using Cr(AcAc)$_3$ supported on fluorided silica-coated alumina, which was treated in nitrogen at various temperatures.

FIG. 6 illustrates the impact of the peak treatment temperature in $N_2$ on the molecular weight distribution. The catalyst system of Example 25 was treated in a $N_2$ atmosphere at various peak sublimation temperatures, and polymerization conditions were as described above for Examples 1-9. Interestingly, the MWD was largely unaffected by the treatment temperature, although there appeared to be a slight change in the molecular weight with increasing temperature.

Figure 7:
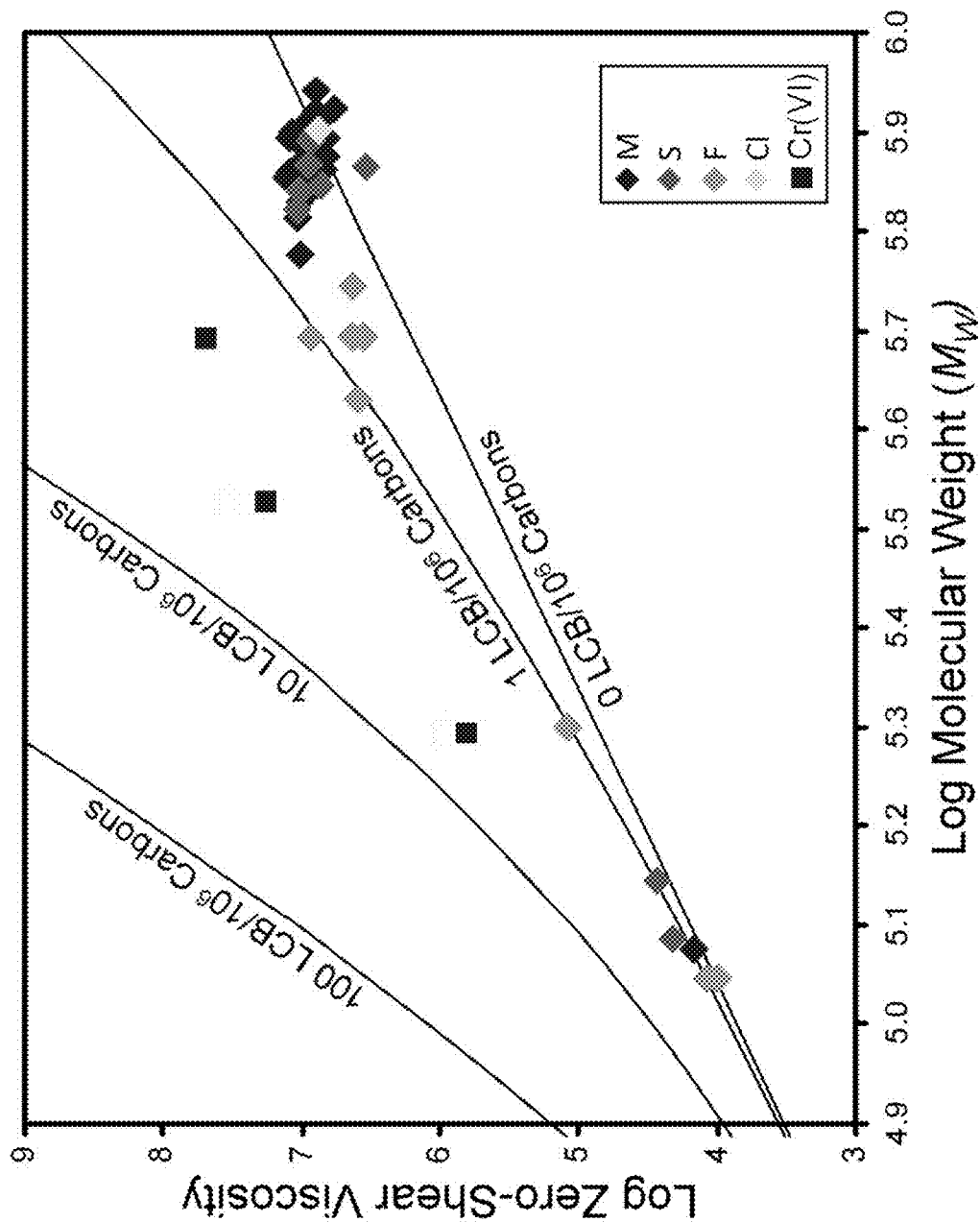
FIG. 7 presents a plot of the logarithm of the zero-shear viscosity versus the logarithm of weight-average molecular weight (Mw) for certain polymers in Table I and Table II, using different activator-supports.

FIG. 7 presents an "Arnett plot," wherein the log of the zero-shear viscosity is plotted against the log of the weight-average molecular weight. When each point is compared to the Janzen-Colby grid lines, the average number of long chain branches (LCB) in the polymer can be determined. FIG. 7 shows the unexpectedly low levels of LCB in the polymers produced using fluorided silica-coated alumina (M), fluorided silica-alumina (F), sulfated alumina (S), and chlorided zinc-aluminate (CO, as compared to the LCB content of commercially available Cr(VI) based polymers.

Figure 8:
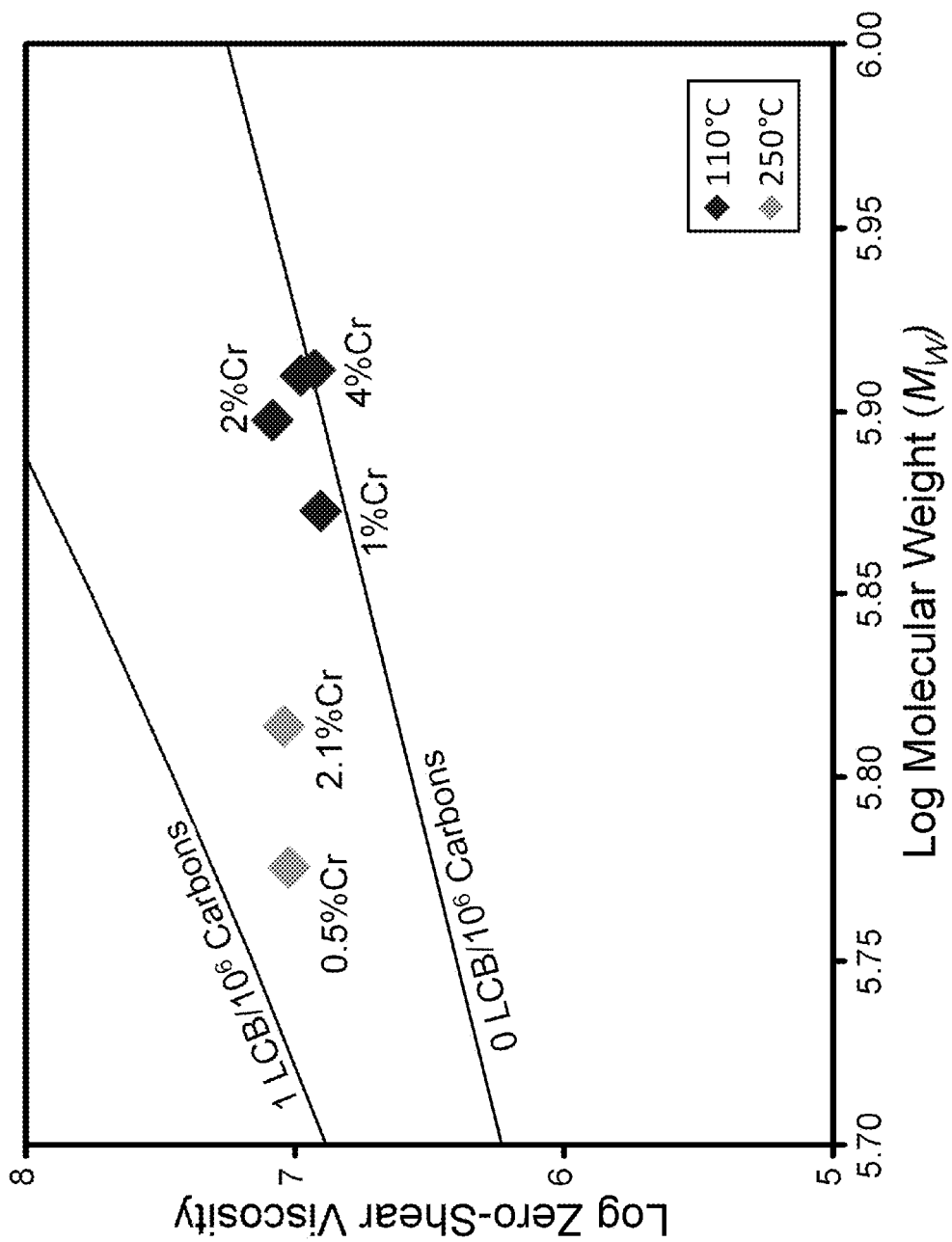
FIG. 8 presents a plot of the logarithm of zero-shear viscosity versus the logarithm of weight-average molecular weight (Mw) for polymers produced using different chromium loadings and using different peak treatment temperatures.

FIG. 8 is another Arnett plot that illustrates how the LCB content is influenced by the treatment temperature and the Cr loading on the catalyst. The catalyst system of Example 25 was modified with different chromium loadings and treated in a $N_2$ atmosphere at peak sublimation temperatures of either 110° C. or 250° C., and polymerization conditions were as described above for Examples 1-9. Unexpectedly, the lower treatment temperature resulted in slightly lower LCB content, and as Cr loading decreased, the LCB content generally increased. This behavior is opposite to that of Cr(VI) catalysts (see McDaniel, Advances in Catalysis, 2010, Chapter 3). Again, polymers produced using chromium (III) compounds had unexpectedly low levels of LCB as compared to standard Cr(VI) catalyst systems.

Figure 9:
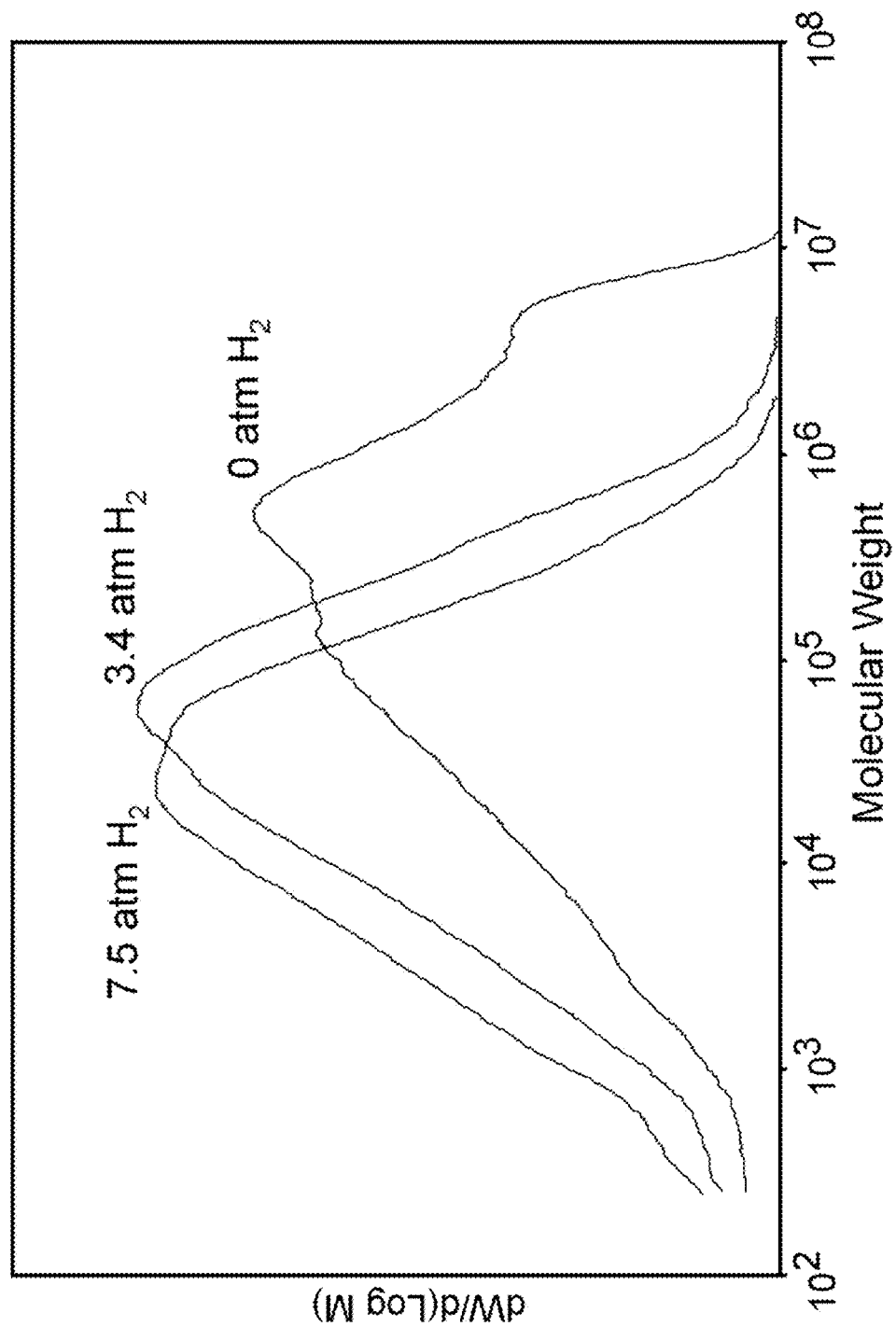
FIG. 9 presents a plot of the molecular weight distributions of the polymers of certain examples shown in Table III, produced using Cr(AcAc)$_3$ supported on fluorided silica-coated alumina, and using different amounts of hydrogen during polymerization.

FIG. 9 illustrates the surprising impact of hydrogen addition during polymerization on the molecular weight distributions of the polymers described herein, which were produced using the catalyst system of Example 25 under polymerization conditions as described above for Examples 1-9, with the exception of the hydrogen addition. Additional results using the same chromium (III) catalyst system are tabulated in Table III and compared to polymers made with a standard Cr(VI)/silica catalyst. Both FIG. 9 and Table III demonstrate the unexpected hydrogen sensitivity of chromium (III) based catalyst systems. In Table III, there is a dramatic increase in melt index as hydrogen is added to the reactor. This is an unexpected and very important characteristic, because it allows virtually any target melt index to be produced, which is not always possible with Cr(VI) catalyst systems. In FIG. 9, the addition of hydrogen has a dramatic change on the molecular weight distribution. In contrast, Cr(VI) catalyst systems have very little sensitivity to hydrogen, as a regulator of molecular weight. The Cr(VI)/silica catalyst in Table III was activated at 800° C., and polymerization conditions were as described above for Examples 1-9, except for the addition of hydrogen. The melt index for polymers produced using Cr(VI) were largely unaffected by hydrogen addition. In sum, the melt index and molecular weight distribution for polymers produced using Cr(III) catalyst systems were significantly, and unexpectedly, affected by hydrogen addition, which can be a very useful feature for commercial polyethylene production.

Figure 10:
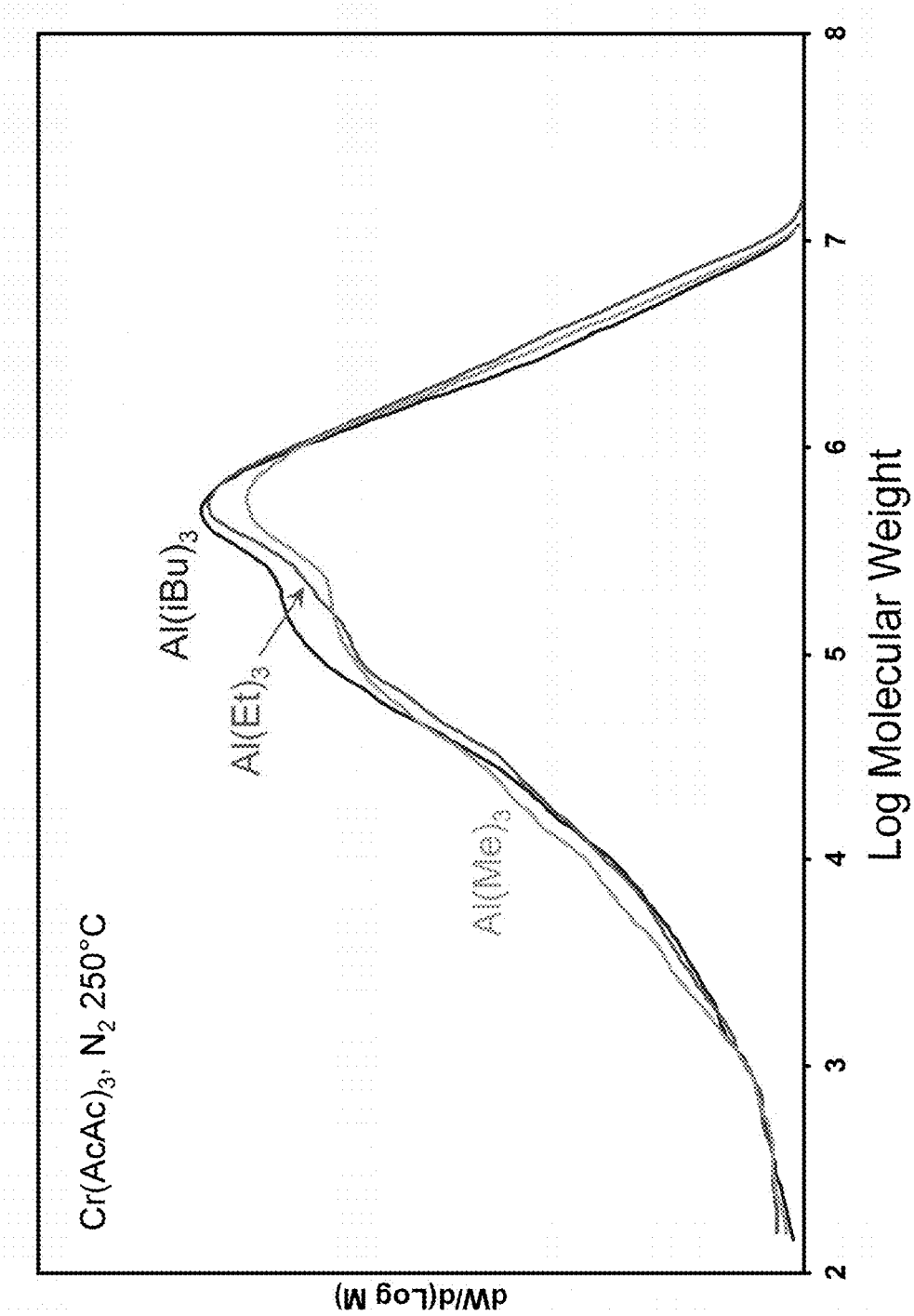
FIG. 10 presents a plot of the molecular weight distributions of polymers made using Cr(AcAc)$_3$ on fluorided silica-coated alumina using different co-catalysts.

Co-catalysts other than TIBA can be used in accordance with aspects of this invention. FIG. 10 illustrates the impact of the co-catalyst type on the molecular weight distribution of the polymers produced using a trimethylaluminum, triethylaluminum, or triisobutylaluminum co-catalyst. The catalyst system of Example 25 was used, as were the polymerization conditions described above for Examples 1-9, with the exception of the co-catalyst type (1 mmol used). FIG. 10 demonstrates that the choice of co-catalyst does not significantly impact the MWD.

Figure 11:
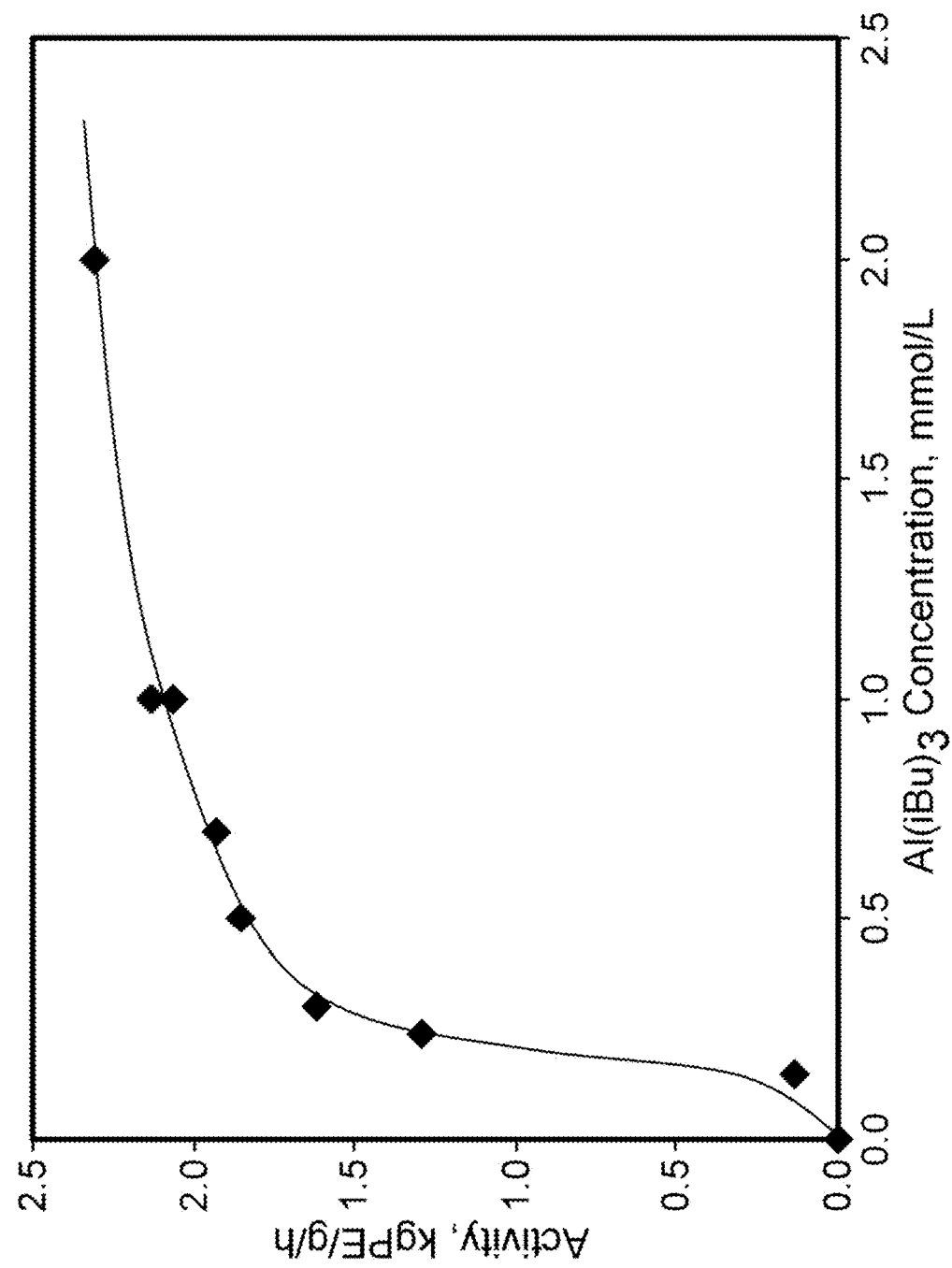
FIG. 11 presents a plot of the catalyst activity of Cr(AcAc)$_3$ on fluorided silica-coated alumina versus the amount of triisobutylaluminum (TIBA) co-catalyst.

FIG. 11 shows that, unexpectedly, the catalysts of this invention can tolerate high levels of aluminum alkyl co-catalysts. Whereas Cr(VI) catalyst systems can lose most of their activity when treated with greater than 10 ppm (0.05 mmol/L) of triethylaluminum (see McDaniel, Advances in Catalysis, 2010, Chapter 3), the catalysts of this invention can tolerate concentrations of co-catalyst of up to 2 mmol/L and above. Hence, these catalysts can be used in combination with other catalyst types that may require high concentrations of co-catalysts, e.g., metallocenes, Ziegler catalysts, etc. The catalyst system of Example 25 was used, as were the polymerization conditions described above for Examples 1-9, with the exception of the amount of TIBA co-catalyst used (in mmol per liter of isobutane).

Figure 12:
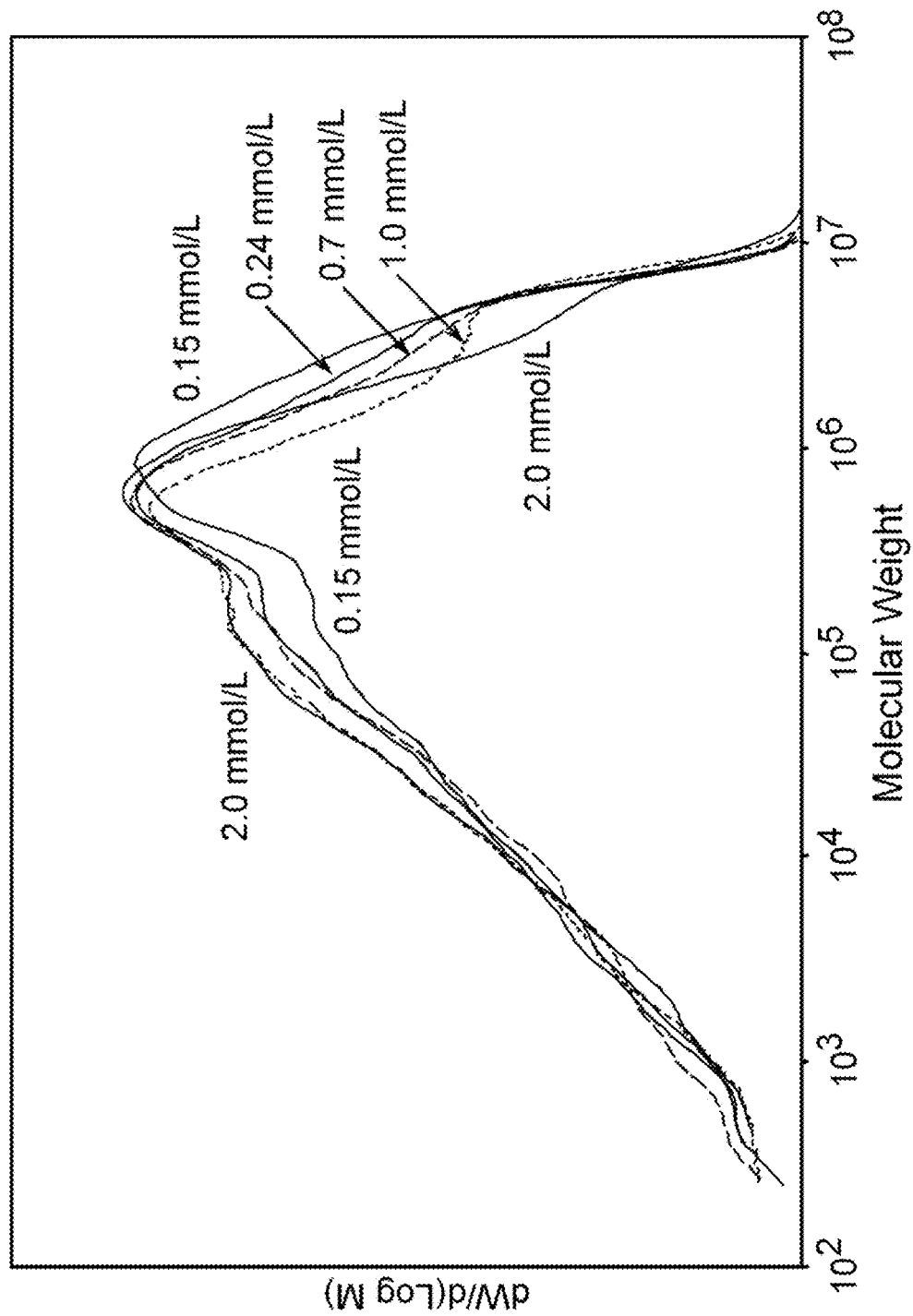
FIG. 12 presents a plot of the molecular weight distributions of polymers produced using different amounts of TIBA co-catalyst.

FIG. 12 shows the molecular weight distributions of some of the polymers whose catalyst activity is presented in FIG. 11. That is, FIG. 12 shows the effect of the co-catalyst loading on the molecular weight distribution of polymers produced using the catalyst system of Example 25 and the polymerization conditions as described above for Examples 1-9, with the exception being the amount of co-catalyst per liter of isobutane. Generally, the amount of the co-catalyst did not significantly impact the MWD.

Figure 13:
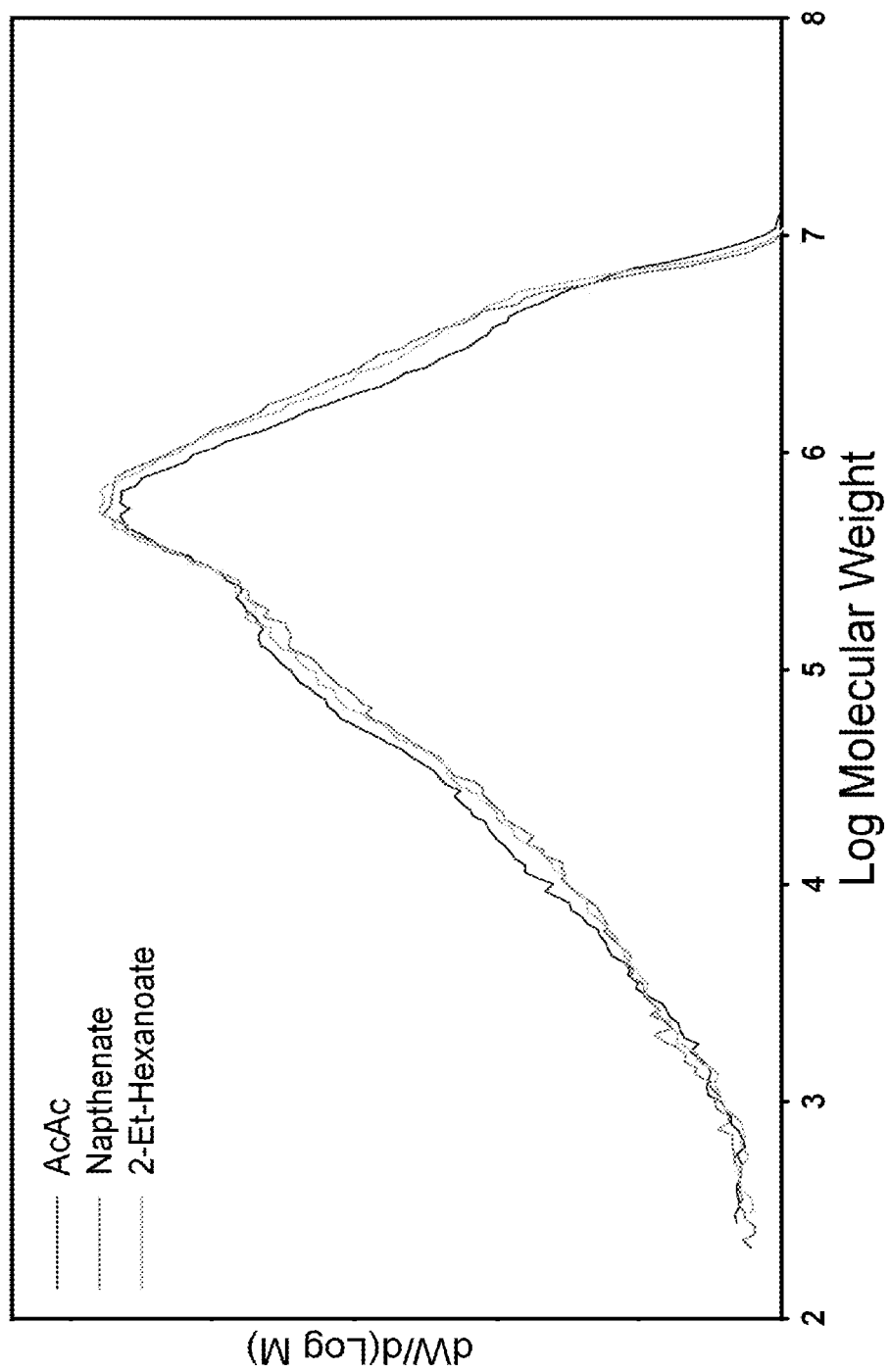
FIG. 13 presents a plot of the molecular weight distributions of polymers produced using different chromium (III) compounds deposited onto fluorided silica-coated alumina.

Chromium (III) compounds other than Cr(AcAc)₃ can be used in accordance with aspects of this invention, e.g., other suitable Cr(III) carboxylate compounds can be used. In a manner similar to Example 25, catalyst systems were produced with chromium (III) napthenate and chromium (III) 2-ethylhexanoate, and polymerization experiments were conducted as described above for Examples 1-9. FIG. 13 illustrates the MWD of the polymers obtained using these chromium (III) compounds; the selection of the Cr(III) compound did not significantly impact the MWD. Accordingly, the unexpected results described herein appear generally applicable to other chromium (III) compounds, e.g., carboxylates, dionates, etc.

Figure 14:
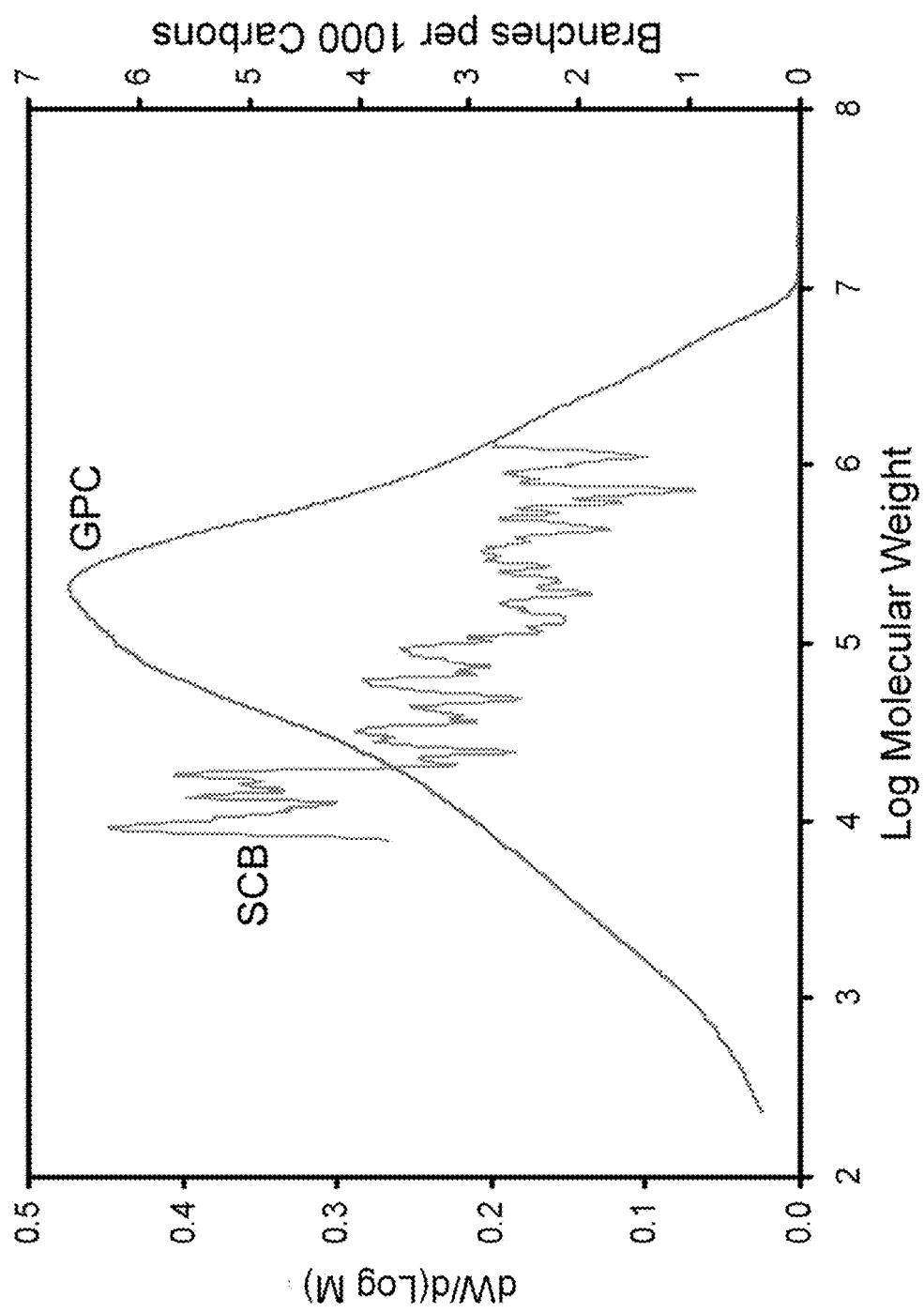
FIG. 14 presents a plot of the molecular weight distribution and short chain branch (SCB) distribution of an ethylene/1-hexene copolymer producing using Cr(AcAc)$_3$ on fluorided silica-coated alumina.

The polymers produced in the examples above were ethylene homopolymers, meaning that no comonomer (1-hexene, 1-butene, 1-octene, etc.) was added to the reactor during polymerization. In spite of this, the polymer density was depressed somewhat, indicating that olefins may have been generated and incorporated into the polymers as branches. Nonetheless, the catalysts of this invention also can be used to produce copolymers of any desired density. In an experiment similar to that of Example 25, the same activator-support (fluorided silica-coated alumina) was dry mixed with Cr(AcAc)₃ to equal 2 wt. % Cr, then heated in nitrogen at 250° C. for 1 hour. This supported chromium catalyst was then tested under slightly different reaction conditions: a 95° C. reaction temperature, with 30 mL of 1-hexene added to the reactor. The resulting copolymer had a density of 0.936 g/mL, instead of the nominal 0.95 density for the homopolymer. The copolymer was analyzed as described herein to determine where the branches were incorporated within the MWD. FIG. 14 illustrates that the SCB's were incorporated more in the lower molecular weight portions of the copolymer, which is typical of copolymers produced using commercial Cr(VI) catalysts. Thus, the copolymers of this invention can have a conventional comonomer distribution, similar to that of commercial Cr(VI) based copolymers.

Because the chromium (III) catalysts of this invention can tolerate high levels of co-catalyst, unlike typical Cr(VI) catalysts, the chromium (III) catalysts can be used with other catalysts to produce a dual component MWD, often a bimodal MWD. In a series of experiments, a standard Cr(III) catalyst of this invention (i.e., fluorided silica-coated alumina dry mixed with Cr(AcAc)₃, and then heated in nitrogen at 250° C. for 1 hour) was used in combination with a metallocene compound. The metallocene compound can be activated by the same activator-support (in the absence of MAO or other activators). The metallocene compound used is shown below:

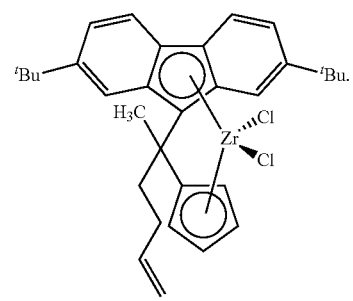

Figure 15:
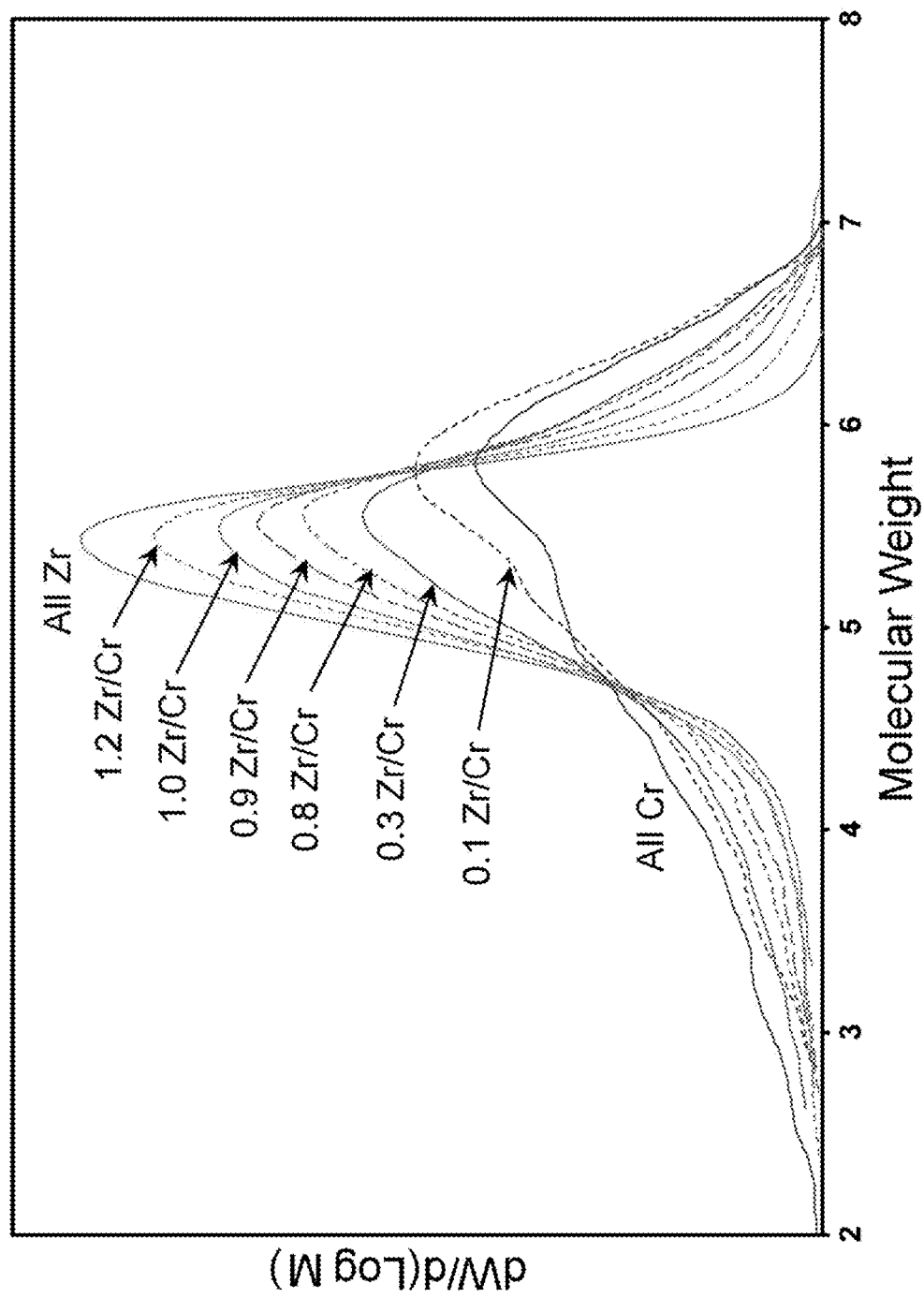
FIG. 15 presents a plot of the molecular weight distributions of polymers produced using a combination of Cr(AcAc)$_3$ and a metallocene compound on fluorided silica-coated alumina, at a range of different zirconium:chromium molar ratios.

The supported catalyst of this invention was charged to the reactor with 1 mmol TIBA co-catalyst, and a small amount of a solution containing the metallocene compound. The activator-support activated both metals, the Cr on the support and the Zr in the metallocene, to produce a dual component MWD. The amount of the metallocene added to the reactor was varied to produce a range of Zr:Cr molar ratios. FIG. 15 demonstrates that a range of MWD's can be produced depending upon the Zr:Cr molar ratio added to the reactor, thus producing a broad range of different types of polymers. This dual catalyst system and dual component polymer are not possible using standard Cr(VI) catalyst systems.

TABLE I

Example 1-9

| Example | Support | Calc. Temp. | Activity gPE/g/h | HLMI (g/10 min) | Density g/mL | $M_N$ kg/mol | $M_W$ kg/mol | $M_Z$ kg/mol | Mw/Mn | Relaxation Time (sec) |
|---|---|---|---|---|---|---|---|---|---|---|
| 1 | Silica (EP10) | 600° C. | 56 | 1.5 | 0.9505 | 8.83 | 637 | 3139 | 72.1 | 52 |
| 2 | Alumina (Grace A) | 600° C. | 103 | 1.2 | 0.9512 | 9.52 | 653 | 3205 | 68.6 | 28 |
| 3 | Aluminophosphate (P/Al 0.9) | 600° C. | 150 | 9.4 | 0.9612 | 5.56 | 468 | 3086 | 84.2 | 98 |
| 4 | Si-Coated Alumina | 600° C. | 141 | 0.5 | 0.9515 | 9.55 | 801 | 3427 | 83.9 | 58 |
| 5 | F—Si-Coated Alumina | 600° C. | 2167 | 0.4 | 0.9472 | 10.15 | 770 | 3116 | 75.9 | 70 |
| 6 | F-Silica-Alumina | 500° C. | 1270 | 5.3 | 0.9531 | 5.13 | 494 | 3229 | 96.3 | 54 |
| 7 | SO₄/Alumina, 1.5 mmol SO4/g | 600° C. | 2083 | 0.9 | 0.9506 | 7.88 | 734 | 3449 | 93.1 | 81 |
| 8 | SO₄/Alumina, 3.6 mmol SO4/g | 400° C. | 276 | 1.5 | 0.9538 | 9.26 | 739 | 2881 | 79.8 | 73 |
| 9 | Cl—Zn/Alumina | 600° C. | 43 | 1.1 | 0.9565 | 9.54 | 796 | 3177 | 83.4 | 70 |

TABLE II

Examples 10-37

| Example | Support | Calc. Temp. | CrAcAc N2 at | Activity gPE/g/h | HLMI (g/10 min) | Density g/mL | $M_N$ kg/mol | $M_W$ kg/mol | $M_Z$ kg/mol | Mw/Mn | Relaxation Time (sec) |
|---|---|---|---|---|---|---|---|---|---|---|---|
| 10 | Silica | 600° C. | 250° C. | 120 | NA | NA | NA | NA | NA | NA | 102 |
| 11 | Alumina | 600° C. | 250° C. | 0 | NA | NA | NA | NA | NA | NA | NA |
| 12 | Alumina | 600° C. | 250° C. | 55 | 0.064 | 0.9523 | 6.7 | 1136 | 3988 | 170 | 28 |
| 13 | Alumina | 600° C. | 250° C. | 69 | NA | NA | NA | NA | NA | NA | NA |
| 14 | Alumina | 600° C. | 250° C. | 48 | 0 | 0.9506 | 10.7 | 1466 | 4537 | 137 | NA |

TABLE II-continued

Examples 10-37

| Example | Support | Calc. Temp. | CrAcAc N2 at | Activity gPE/g/h | HLMI (g/10 min) | Density g/mL | $M_N$ kg/mol | $M_W$ kg/mol | $M_Z$ kg/mol | Mw/Mn | Relaxation Time (sec) |
|---|---|---|---|---|---|---|---|---|---|---|---|
| 15 | Aluminophosphate (P/Al 0.9) | 600° C. | 250° C. | 240 | 13.1 | 0.9570 | 2.8 | 352 | 2246 | 126 | 70 |
| 16 | Aluminophosphate (P/Al 0.6) w F | 600° C. | 250° C. | 563 | 6.21 | 0.9546 | 3.8 | 412 | 2573 | 109 | 61 |
| 17 | Aluminophosphate (P/Al 0.2) | 600° C. | 250° C. | 157 | 0.596 | 0.9536 | 6.3 | 658 | 3137 | 105 | 71 |
| 18 | Si-Coated Alumina | 400° C. | 250° C. | 204 | 0 | 0.9465 | 9.7 | 906 | 3047 | 93.7 | 48 |
| 19 | Si-Coated Alumina | 600° C. | 250° C. | 646 | 0.004 | 0.9444 | 16.4 | 856 | 2875 | 52.1 | 45 |
| 20 | Si-Coated Alumina | 800° C. | 250° C. | 1437 | 0 | NA | NA | NA | NA | NA | 48 |
| 21 | Si-Coated Alumina | 800° C. | 250° C. | 1184 | 0.021 | 0.9459 | 12.6 | 725 | 2668 | 57.8 | 61 |
| 22 | F—Si-Coated Alumina | 600° C. | 150° C. | 2935 | 0.273 | 0.9466 | 20.4 | 675 | 2516 | 33.0 | 80 |
| 23 | F—Si-Coated Alumina | 600° C. | 250° C. | 4496 | 0.028 | 0.9478 | 14.3 | 652 | 2465 | 45.6 | 62 |
| 24 | F—Si-Coated Alumina | 600° C. | 0.5% Cr, 250° C. | 2680 | 0.060 | 0.9503 | 19.9 | 597 | 2212 | 29.9 | 85 |
| 25 | F—Si-Coated Alumina | 600° C. | 250° C. | 5205 | 0.075 | 0.9495 | 13.1 | 699 | 3049 | 53.3 | 65 |
| 26 | F—Si-Coated Alumina | 600° C. | 250° C. | 3303 | 0.052 | 0.9484 | 10.2 | 701 | 2952 | 68.7 | 65 |
| 27 | F—Si-Coated Alumina | 600° C. | 250° C. | 3174 | 0.117 | NA | NA | NA | NA | NA | 44 |
| 28 | SO4/Alumina 1.6 mmol SO4/g | 600° C. | 150° C. | 541 | 0.258 | 0.9504 | 19.4 | 787 | 2918 | 40.6 | 60 |
| 29 | SO4/Alumina 1.6 mmol SO4/g | 600° C. | 250° C. | 1072 | 0.404 | 0.9517 | 8.5 | 662 | 3136 | 78.0 | 125 |
| 30 | SO4/Alumina 1.6 mmol SO4/g | 600° C. | 250° C. | 1126 | 0.393 | 0.9526 | 6.7 | 692 | 3242 | 103 | 119 |
| 31 | F—Si-Coated Ti-Alumina | 600° C. | 250° C. | 2466 | 0.085 | 0.9477 | 5.3 | 664 | 2524 | 125 | 68 |
| 32 | F-Silica-Alumina | 500° C. | 250° C. | 1220 | 5.556 | 0.9529 | 5.3 | 427 | 2617 | 81.1 | 29 |
| 33 | Cl—F—Si-Coated Alumina | 600° C. | 120° C. | 5365 | 0.007 | 0.9492 | 5.74 | 725 | 2781 | 126.3 | 57 |
| 34 | Cl—F—Si-Coated Alumina | 600° C. | 120° C. | 6734 | 0.09 | NA | 5.66 | 750 | 2888 | 132.5 | 44 |
| 35 | Cr/silica - Cr(VI) | 700° C. | NA, Air | 2166 | 4.31 | 0.9632 | 11.1 | 272 | 1638 | 24.6 | 138 |
| 36 | Cr/alumina - Cr(VI) | 600° C. | NA, Air | 372 | 13.8 | 0.9621 | 6.92 | 357 | 3425 | 51.6 | 146 |
| 37 | Cr/Si-Coated-Alumina - Cr(VI) | 600° C. | NA, Air | 511 | 0.90 | 0.9592 | 18.3 | 511 | 3194 | 27.8 | 291 |

TABLE III

Impact of Hydrogen Addition

| Supported Catalyst | Mole % $H_2$ (based on ethylene) | Melt Index (MI, g/10 min) |
|---|---|---|
| Cr(VI)/Silica, 800° C. | 0 | 0.55 |
| | 0.2 | 0.72 |
| | 0.5 | 0.98 |
| | 1.0 | 1.15 |
| Cr(AcAc)$_3$ on F—Si-Coated Alumina | 0 | 0 |
| | 0.41 | 2.3 |
| | 0.82 | 18.5 |

This invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. A process to produce a supported chromium catalyst, the process comprising:

(i) combining a chromium (III) compound (or trivalent chromium) with an activator-support comprising a solid oxide treated with an electron-withdrawing anion to form a mixture; and (ii) subjecting (or exposing, or treating) the mixture to a non-oxidizing atmosphere at a peak temperature to produce the supported chromium catalyst.

Embodiment 2. The process defined in embodiment 1, wherein the peak temperature is in any peak temperature range disclosed herein, e.g., from about 25° C. to about 600° C., from about 150° C. to about 350° C., etc.

Embodiment 3. The process defined in embodiment 1 or 2, wherein the step (ii) is conducted for a time period in any range of time periods disclosed herein, e.g., from about 30 minutes to about 12 hours, from about 1 hour to about 6 hours, etc.

Embodiment 4. The process defined in any one of embodiments 1-3, wherein the non-oxidizing atmosphere is any inert atmosphere disclosed herein, e.g., comprising nitrogen, neon, argon, a vacuum, etc., as well as combinations thereof.

Embodiment 5. The process defined in any one of embodiments 1-3, wherein the non-oxidizing atmosphere is any reducing atmosphere disclosed herein, e.g., comprising $H_2$, CO, etc., as well as combinations thereof.

Embodiment 6. The process defined in any one of embodiments 1-5, wherein step (i) is conducted at a temperature in any temperature range disclosed herein, e.g., from about 0° C. to about 100° C., from about 10° C. to about 50° C., etc.

Embodiment 7. The process defined in any one of embodiments 1-6, wherein step (i) comprises dry mixing the activator-support with the chromium (III) compound, and step (ii) comprises subjecting the mixture to the non-oxidizing atmosphere at a peak temperature sufficient for at least a portion of the chromium (III) compound to sublime (or vaporize) and impregnate the activator-support.

Embodiment 8. The process defined in any one of embodiments 1-6, wherein step (i) comprises mixing the activator-support with the chromium (III) compound in a solvent, and step (ii) comprises subjecting the mixture to the non-oxidizing atmosphere at a peak temperature sufficient to remove the solvent.

Embodiment 9. catalyst composition comprising:

a supported chromium catalyst comprising (a) a chromium (III) compound, or a derivative thereof; and (b) an activator-support comprising a solid oxide treated with an electron-withdrawing anion; and a co-catalyst.

Embodiment 10. The process or composition defined in any one of embodiments 1-9, wherein the chromium (III)

compound comprises any chromium (III) compound disclosed herein, e.g., a chromium (III) 1,3-diketone compound, chromium (III) acetylacetonate, etc., or a derivative thereof; a compound containing only chromium, carbon, hydrogen, and oxygen atoms; not a chromium oxide or other chromium compound that does not contain a carbon atom; etc.

Embodiment 11. The process or composition defined in any one of embodiments 1-9, wherein the chromium (III) compound comprises chromium (III) formate, chromium (III) acetate, chromium (III) propionate, chromium (III) butyrate, chromium (III) pentanoate, chromium (III) neopentanoate, chromium (III) hexanoate, chromium (III) 2-ethylhexanoate, chromium (III) benzoate, chromium (III) naphthenate, chromium (III) oleate, chromium (III) oxalate, chromium (III) acetylacetonate, chromium (III) stearate, chromium (III) laurate, a derivative thereof, or a combination thereof.

Embodiment 12. The process or composition defined in any one of embodiments 1-9, wherein the chromium (III) compound comprises chromium (III) 1,3-butanedionate, chromium (III) 2,4-hexanedionate, chromium (III) 2,4-heptanedionate, chromium (III) 2,4-octanedionate, chromium (III) 3,5-octanedionate, chromium (III) benzoylacetonate, chromium (III) 1,3-diphenyl-1,3-propanedionate, chromium (III) 2-methyl-1,3-butanedionate, chromium (III) 2-ethyl-1,3-butanedionate, chromium (III) 2-phenyl-1,3-butanedionate, chromium (III) 1,2,3-triphenyl-1,3-propanedionate, chromium (III) 2,2,6,6-tetramethylheptanedionate, a derivative thereof, or a combination thereof.

Embodiment 13. The process or composition defined in any one of the preceding embodiments, wherein the solid oxide comprises any solid oxide disclosed herein, e.g., alumina, silica-alumina, silica-coated alumina, aluminum phosphate, aluminophosphate, heteropolytungstate, titania, silica-titania, zirconia, silica-zirconia, magnesia, boria, zinc oxide, etc., as well as any mixed oxide thereof or any mixture thereof.

Embodiment 14. The process or composition defined in any one of the preceding embodiments, wherein the solid oxide comprises alumina, silica-alumina, silica-coated alumina, or any mixture thereof.

Embodiment 15. The process or composition defined in any one of the preceding embodiments, wherein the solid oxide comprises silica-alumina or silica-coated alumina, either comprising silica in any range of weight percentages disclosed herein, e.g., from about 10 to about 80 wt. % silica, from about 20 to about 70 wt. % silica, from about 25 to about 50 wt. % silica, etc., based on the weight of the silica-alumina or silica-coated alumina.

Embodiment 16. The process or composition defined in any one of the preceding embodiments, wherein the electron-withdrawing anion comprises any electron withdrawing anion disclosed herein, e.g., sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, etc., as well as any combination thereof.

Embodiment 17. The process or composition defined in any one of the preceding embodiments, wherein the electron-withdrawing anion comprises fluoride and/or sulfate (or fluoride and/or chloride).

Embodiment 18. The process or composition defined in any one of the preceding embodiments, wherein the activator-support comprises a fluorided solid oxide and/or a sulfated solid oxide.

Embodiment 19. The process or composition defined in any one of the preceding embodiments, wherein the activator-support comprises any activator-support disclosed herein, e.g., fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, chlorided/fluorided silica-coated alumina, etc., as well as combinations thereof.

Embodiment 20. The process or composition defined in any one of the preceding embodiments, wherein the activator-support comprises fluorided alumina, sulfated alumina, fluorided silica-alumina, sulfated silica-alumina, fluorided silica-coated alumina, sulfated silica-coated alumina, or any combination thereof.

Embodiment 21. The process or composition defined in any one of the preceding embodiments, wherein the weight percentage of chromium (present in the chromium (III) compound), based on the weight of the activator-support, is in any weight percentage range disclosed herein, e.g., from about 0.1 to about 10 wt. %, from about 0.25 to about 5 wt. %, from about 0.5 to about 2 wt. %, etc.

Embodiment 22. The process or composition defined in any one of the preceding embodiments, wherein the weight percentage of the electron-withdrawing anion, based on the weight of the activator-support, is in any range of weight percentages disclosed herein, e.g., from about 1 to about 20 wt. %, from about 2 to about 15 wt. %, from about 3 to about 12 wt. %, etc.

Embodiment 23. The composition defined in any one of embodiments 9-22, wherein the catalyst composition comprises any co-catalyst disclosed herein.

Embodiment 24. The composition defined in any one of embodiments 9-23, wherein the catalyst composition comprises an aluminoxane co-catalyst, an organoaluminum co-catalyst, an organoboron co-catalyst, or any combination thereof.

Embodiment 25. The composition defined in any one of embodiments 9-24, wherein the catalyst composition comprises an organoaluminum co-catalyst comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 26. The composition defined in any one of embodiments 9-25, wherein the catalyst composition comprises an organoaluminum co-catalyst (e.g., triisobutylaluminum) in a organoaluminum:chromium molar ratio range from about 10:1 to about 1000:1 (e.g., 100:1), and is characterized by a catalyst activity greater than 500 grams (or 1000 grams) of ethylene polymer per gram of supported catalyst per hour, under slurry polymerization conditions, using isobutane as a diluent, and with a polymerization temperature of 100° C. and a reactor pressure of 550 psig.

Embodiment 27. The composition defined in any one of embodiments 9-26, further comprising a metallocene compound, e.g., any metallocene compound disclosed herein, at a molar ratio of chromium to metal of the metallocene compound in any molar ratio range disclosed herein, e.g., from about 1:20 to about 20:1, from about 5:1 to about 1:5, etc.

Embodiment 28. An olefin polymerization process, the process comprising contacting the catalyst composition defined in any one of embodiments 9-27 with an olefin monomer and an optional olefin comonomer in a polymerization reactor system under polymerization conditions to produce an olefin polymer.

Embodiment 29. The process defined in embodiment 28, wherein the olefin monomer comprises any olefin monomer disclosed herein, e.g., any $C_2$-$C_{20}$ olefin.

Embodiment 30. The process defined in embodiment 28 or 29, wherein the olefin monomer and the optional olefin comonomer independently comprise a $C_2$-$C_{20}$ alpha-olefin.

Embodiment 31. The process defined in any one of embodiments 28-30, wherein the olefin monomer comprises ethylene.

Embodiment 32. The process defined in any one of embodiments 28-31, wherein the catalyst composition is contacted with ethylene and an olefin comonomer comprising a $C_3$-$C_{10}$ alpha-olefin.

Embodiment 33. The process defined in any one of embodiments 28-32, wherein the catalyst composition is contacted with ethylene and an olefin comonomer comprising 1-butene, 1-hexene, 1-octene, or a mixture thereof.

Embodiment 34. The process defined in any one of embodiments 28-30, wherein the olefin monomer comprises propylene.

Embodiment 35. The process defined in any one of embodiments 28-34, wherein the polymerization reactor system comprises a batch reactor, a slurry reactor, a gas-phase reactor, a solution reactor, a high pressure reactor, a tubular reactor, an autoclave reactor, or a combination thereof.

Embodiment 36. The process defined in any one of embodiments 28-35, wherein the polymerization reactor system comprises a slurry reactor, a gas-phase reactor, a solution reactor, or a combination thereof.

Embodiment 37. The process defined in any one of embodiments 28-36, wherein the polymerization reactor system comprises a loop slurry reactor.

Embodiment 38. The process defined in any one of embodiments 28-37, wherein the polymerization reactor system comprises a single reactor.

Embodiment 39. The process defined in any one of embodiments 28-37, wherein the polymerization reactor system comprises 2 reactors.

Embodiment 40. The process defined in any one of embodiments 28-37, wherein the polymerization reactor system comprises more than 2 reactors.

Embodiment 41. The process defined in any one of embodiments 28-40, wherein the olefin polymer comprises any olefin polymer disclosed herein.

Embodiment 42. The process defined in any one of embodiments 28-33 and 35-41, wherein the olefin polymer is an ethylene/1-butene copolymer, an ethylene/1-hexene copolymer, or an ethylene/1-octene copolymer.

Embodiment 43. The process defined in any one of embodiments 28-33 and 35-41, wherein the olefin polymer is an ethylene/1-hexene copolymer.

Embodiment 44. The process defined in any one of embodiments 28-30 and 34-41, wherein the olefin polymer is a polypropylene homopolymer or a propylene-based copolymer.

Embodiment 45. he process defined in any one of embodiments 28-44, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 46. The process defined in any one of embodiments 28-45, wherein the polymerization conditions are substantially constant, e.g., for a particular polymer grade.

Embodiment 47. The process defined in any one of embodiments 28-46, wherein no hydrogen is added to the polymerization reactor system.

Embodiment 48. The process defined in any one of embodiments 28-46, wherein hydrogen is added to the polymerization reactor system.

Embodiment 49. The process defined in embodiment 48, wherein an increase in the melt index of the olefin polymer with the addition of hydrogen from 0 to 1 mol % (based on the olefin monomer) is greater than the increase in melt index obtained using a Cr(VI)/silica catalyst, under the same polymerization conditions.

Embodiment 50. The process defined in embodiment 48, wherein a melt index of an olefin polymer produced by the process in the presence of 0.5 mol % hydrogen (based on the olefin monomer) is greater than the melt index of an olefin polymer obtained using a Cr(VI)/silica catalyst, under the same polymerization conditions.

Embodiment 51. The process defined in any one of embodiments 28-50, wherein a polymer defined in any one of embodiments 53-62 is produced.

Embodiment 52. An olefin polymer produced by the olefin polymerization process defined in any one of embodiments 28-51.

Embodiment 53. An ethylene polymer having (I) a ratio of Mw/Mn of greater than or equal to about 35, or greater than or equal to about 50, or greater than equal to about 70, or greater than or equal to about 90; and (II) a Mw in a range from about 200,000 to about 2,000,000 g/mol, or from about 300,000 to about 1,000,000 g/mol, or from about 400,000 to about 900,000 g/mol, or from about 500,000 to about 900,000 g/mol.

Embodiment 54. The polymer defined in embodiment 53, wherein the ethylene polymer has a relaxation time in any range disclosed herein, e.g., less than or equal to about 500 sec, less than or equal to about 100 sec, less than or equal to about 85 sec, less than or equal to about 70 sec, etc.

Embodiment 55. The polymer defined in embodiment 53 or 54, wherein the ethylene polymer has less than or equal to about 0.005 long chain branches (LCB) per 1000 total carbon atoms, e.g., less than or equal to about 0.002 LCB per 1000 total carbon atoms, less than or equal to about 0.001 LCB per 1000 total carbon atoms, etc.

Embodiment 56. The polymer defined in any one of embodiments 53-55, wherein the ethylene polymer has a density in any range disclosed herein, e.g., from about 0.90 to about 0.97, from about 0.92 to about 0.96, from about 0.93 to about 0.955, from about 0.94 to about 0.95 g/cm³, etc.

Embodiment 57. The polymer defined in any one of embodiments 53-56, wherein the ethylene polymer has a conventional comonomer distribution, e.g., the number of short chain branches (SCB) per 1000 total carbon atoms of the polymer at Mn is greater than at Mz, the number of SCB per 1000 total carbon atoms at Mn is greater than at Mw, etc.

Embodiment 58. The polymer defined in any one of embodiments 53-57, wherein the ethylene polymer has a melt index less than or equal to about 100, less than or equal to about 10, less than or equal to about 5, less than or equal to about 1 g/10 min, etc.

Embodiment 59. The polymer defined in any one of embodiments 53-58, wherein the ethylene polymer has a HLMI in any range disclosed herein, e.g., less than or equal to about 1000, less than or equal to about 100, less than or equal to about 10, less than or equal to about 5, less than or equal to about 1 g/10 min, etc.

Embodiment 60. The polymer defined in any one of embodiments 53-59, wherein the ethylene polymer has a ratio of Mz/Mw in any range disclosed herein, e.g., from about 1.5 to about 10, from about 2 to about 8, from about 2 to about 6, from about 2 to about 5, etc.

Embodiment 61. The polymer defined in any one of embodiments 53-60, wherein the ethylene polymer has a Mn in any range disclosed herein, e.g., from about 2,000 to about 25,000, from about 2,000 to about 20,000, from about 3,000 to about 19,000, from about 4,000 to about 15,000 g/mol, etc.

Embodiment 62. The polymer defined in any one of embodiments 53-61, wherein the ethylene polymer has a Mz in any range disclosed herein, e.g., from about 1,000,000 to about 5,000,000, from about 1,500,000 to about 4,000,000, from about 2,000,000 to about 3,500,000 g/mol, etc.

Embodiment 63. An article of manufacture comprising the polymer defined in any one of embodiments 52-62.

Embodiment 64. A method for forming or preparing an article of manufacture comprising an olefin polymer, the method comprising (i) performing the olefin polymerization process defined in any one of embodiments 28-50 to produce the olefin polymer, and (ii) forming the article of manufacture comprising the olefin polymer defined in any one of embodiments 52-62, e.g., via any technique disclosed herein.

Embodiment 65. The article defined in embodiment 63 or 64, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. An olefin polymerization process, the process comprising:
   (i) combining a chromium (III) compound with an activator-support comprising a solid oxide treated with an electron-withdrawing anion to form a mixture;
   (ii) subjecting the mixture to a non-oxidizing atmosphere at a peak temperature to produce a supported chromium catalyst; and
   (iii) contacting the supported chromium catalyst and a co-catalyst with ethylene and an optional olefin comonomer in a polymerization reactor system under polymerization conditions to produce an ethylene polymer, wherein a molar ratio of co-catalyst:chromium is in a range from about 50:1 to about 500:1; and
   wherein the ethylene polymer has a melt index in a range from 0 to about 0.5 g/10 min, and a Mw in a range from about 400,000 to about 900,000 g/mol.

2. The process of claim 1, wherein:
   an increase in melt index of the ethylene polymer produced by the process with the addition of hydrogen from 0 to 1 mol %, based on ethylene, is greater than an increase in melt index of an ethylene polymer obtained using a Cr(VI)/silica catalyst system, under the same polymerization conditions; or
   a melt index of an ethylene polymer produced by the process in the presence of 0.5 mol % hydrogen, based on ethylene, is greater than a melt index of an ethylene polymer obtained using a Cr(VI)/silica catalyst system, under the same polymerization conditions; or both.

3. The process of claim 1, wherein:
   the polymerization reactor system comprises a slurry reactor, gas-phase reactor, solution reactor, or a combination thereof; and
   the supported chromium catalyst and the co-catalyst are contacted with ethylene and an olefin comonomer comprising 1-butene, 1-hexene, 1-octene, or a mixture thereof.

4. The process of claim 1, wherein the ethylene polymer is an ethylene/α-olefin copolymer characterized by a number of short chain branches (SCB) per 1000 total carbon atoms at Mn that is greater than at Mw.

5. The process of claim 1, wherein the ethylene polymer is characterized by:
   a ratio of Mw/Mn in a range from about 90 to about 200; and/or
   a HLMI of less than or equal to about 1 g/10 min; and
   wherein the ethylene polymer is an ethylene homopolymer, an ethylene/1-butene copolymer, an ethylene/1-hexene copolymer, or an ethylene/1-octene copolymer.

6. The process of claim 1, wherein the peak temperature is in a range from about 25° C. to about 600° C.

7. The process of claim 1, wherein the non-oxidizing atmosphere is an inert atmosphere.

8. The process of claim 1, wherein step (i) comprises dry mixing the activator-support with the chromium (III) compound, and step (ii) comprises subjecting the mixture to the non-oxidizing atmosphere at a peak temperature sufficient for at least a portion of the chromium (III) compound to sublime or vaporize and impregnate the activator-support.

9. The process of claim 1, wherein step (i) comprises mixing the activator-support with the chromium (III) compound in a solvent, and step (ii) comprises subjecting the mixture to the non-oxidizing atmosphere at a peak temperature sufficient to remove the solvent.

10. The process of claim 1, wherein:
    the chromium (III) compound comprises chromium (III) formate, chromium (III) acetate, chromium (III) propionate, chromium (III) butyrate, chromium (III) pentanoate, chromium (III) neopentanoate, chromium (III) hexanoate, chromium (III) 2-ethylhexanoate, chromium (III) benzoate, chromium (III) naphthenate, chromium (III) oleate, chromium (III) oxalate, chromium (III) acetylacetonate, chromium (III) stearate, chromium (III) laurate, or any combination thereof; and
    the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

11. The process of claim 1, wherein:
    the chromium (III) compound comprises chromium (III) acetylacetonate; and
    the activator-support comprises a fluorided solid oxide and/or a sulfated solid oxide.

12. The process of claim 1, wherein:
    a weight percentage of chromium, based on the weight of the activator-support, is in a range from about 0.25 to about 5 wt %; and
    a weight percentage of the electron-withdrawing anion, based on the weight of the activator-support, is in a range from about 2 to about 15 wt %.

13. The process of claim 1, wherein the co-catalyst comprises an aluminoxane co-catalyst.

14. The process of claim 1, wherein the co-catalyst comprises an organoaluminum co-catalyst.

15. The process of claim 1, wherein:
the chromium (III) compound comprises chromium (III) formate, chromium (III) acetate, chromium (III) propionate, chromium (III) butyrate, chromium (III) pentanoate, chromium (III) neopentanoate, chromium (III) hexanoate, chromium (III) 2-ethylhexanoate, chromium (III) benzoate, chromium (III) naphthenate, chromium (III) oleate, chromium (III) oxalate, chromium (III) acetylacetonate, chromium (III) stearate, chromium (III) laurate, a derivative thereof, or any combination thereof;
the activator-support comprises sulfated alumina, fluorided silica-alumina, fluorided silica-coated alumina, or any combination thereof; and
the co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

16. The process of claim 15, wherein the ethylene polymer is characterized by:
a ratio of Mw/Mn in a range from about 90 to about 200; and/or
a HLMI of less than or equal to about 1 g/10 min; and
wherein the ethylene polymer is an ethylene homopolymer, an ethylene/1-butene copolymer, an ethylene/1-hexene copolymer, or an ethylene/1-octene copolymer.

17. The process of claim 16, wherein greater than 500 grams of the ethylene polymer per gram of the supported chromium catalyst are produced per hour, under slurry polymerization conditions, using isobutane as a diluent, with an organoaluminum:chromium molar ratio of 100:1, and with a polymerization temperature of 100° C. and a reactor pressure of 550 psig.

18. An olefin polymerization process, the process comprising:
(i) combining a chromium (III) compound with an activator-support comprising a solid oxide treated with an electron-withdrawing anion to form a mixture;
(ii) subjecting the mixture to a non-oxidizing atmosphere at a peak temperature in a range from about 25° C. to about 250° C. to produce a supported chromium catalyst; and
(iii) contacting the supported chromium catalyst and a co-catalyst with ethylene and an optional olefin comonomer in a polymerization reactor system under polymerization conditions to produce from about 2000 to about 10,000 grams of the ethylene polymer per gram of the supported chromium catalyst per hour;
wherein the ethylene polymer has a melt index in a range from 0 to about 0.5 g/10 min.

19. The process of claim 18, wherein:
the non-oxidizing atmosphere is an inert atmosphere;
the polymerization reactor system comprises a slurry reactor, gas-phase reactor, solution reactor, or a combination thereof; and
the supported chromium catalyst and the co-catalyst are contacted with ethylene and an olefin comonomer comprising 1-butene, 1-hexene, 1-octene, or a mixture thereof.

20. The process of claim 18, wherein:
the chromium (III) compound comprises chromium (III) formate, chromium (III) acetate, chromium (III) propionate, chromium (III) butyrate, chromium (III) pentanoate, chromium (III) neopentanoate, chromium (III) hexanoate, chromium (III) 2-ethylhexanoate, chromium (III) benzoate, chromium (III) naphthenate, chromium (III) oleate, chromium (III) oxalate, chromium (III) acetylacetonate, chromium (III) stearate, chromium (III) laurate, a derivative thereof, or any combination thereof;
the activator-support comprises sulfated alumina, fluorided silica-alumina, fluorided silica-coated alumina, or any combination thereof; and
the co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, di ethylaluminum ethoxide, diethylaluminum chloride, or any combination thereof.

21. The process of claim 18, wherein the ethylene polymer is characterized by:
a ratio of Mw/Mn in a range from about 90 to about 200; and/or
a HLMI of less than or equal to about 1 g/10 min.

22. The process of claim 18, wherein:
a weight percentage of chromium, based on the weight of the activator-support, is in a range from about 0.25 to about 5 wt %;
the chromium (III) compound comprises chromium (III) acetylacetonate;
a weight percentage of the electron-withdrawing anion, based on the weight of the activator-support, is in a range from about 2 to about 15 wt %; and
the activator-support comprises a fluorided solid oxide and/or a sulfated solid oxide.

23. The process of claim 18, wherein the polymerization reactor system comprises a loop slurry reactor.

24. An olefin polymerization process, the process comprising:
(i) combining chromium (III) acetylacetonate with an activator-support comprising a fluorided solid oxide and/or a sulfated solid oxide to form a mixture;
(ii) subjecting the mixture to an inert atmosphere at a peak temperature to produce a supported chromium catalyst; and
(iii) contacting the supported chromium catalyst and a co-catalyst with ethylene and an optional olefin comonomer in a polymerization reactor system under polymerization conditions to produce an ethylene polymer; wherein
the molar ratio of co-catalyst:chromium is in a range from about 50:1 to about 500:1;
the polymerization reactor system comprises a loop slurry reactor, gas-phase reactor, solution reactor, or a combination thereof; and
the ethylene polymer has a melt index in a range from 0 to about 0.5 g/10 min, and a ratio of Mw/Mn in a range from about 35 to about 150.

* * * * *